US012598396B2

(12) United States Patent
Jang

(10) Patent No.: US 12,598,396 B2
(45) Date of Patent: Apr. 7, 2026

(54) RANDOM NUMBER GENERATOR FOR MULTICHANNEL IMAGE SENSING DEVICE

(71) Applicant: SAMSUNG ELECTRONICS CO., LTD., Suwon-si (KR)

(72) Inventor: Chanyoung Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/612,125

(22) Filed: Mar. 21, 2024

(65) Prior Publication Data

US 2024/0323546 A1 Sep. 26, 2024

(30) Foreign Application Priority Data

Mar. 24, 2023 (KR) ........................ 10-2023-0039161
May 23, 2023 (KR) ........................ 10-2023-0066494

(51) Int. Cl.
*H04N 23/80* (2023.01)
*H04N 25/618* (2023.01)
*H04N 25/779* (2023.01)
*H04N 25/78* (2023.01)

(52) U.S. Cl.
CPC ........... *H04N 23/80* (2023.01); *H04N 25/618* (2023.01); *H04N 25/779* (2023.01); *H04N 25/78* (2023.01)

(58) Field of Classification Search
None
See application file for complete search history.

(56) References Cited

U.S. PATENT DOCUMENTS

| | | | |
|---|---|---|---|
| 4,455,611 A * | 6/1984 | Powers ................ | H04N 7/0135 |
| | | | 348/E7.012 |
| 7,663,524 B2 | 2/2010 | Lin et al. | |
| 7,827,223 B2 | 11/2010 | Gressel et al. | |
| 8,374,214 B2 | 2/2013 | Roh et al. | |
| 9,430,192 B2 | 8/2016 | Caron et al. | |
| 9,710,231 B2 | 7/2017 | Youn et al. | |
| 9,747,077 B2 | 8/2017 | Sanguinetti et al. | |
| 9,747,078 B2 | 8/2017 | Moschopoulos et al. | |
| 10,411,883 B2 | 9/2019 | Pernull et al. | |
| 2009/0154831 A1* | 6/2009 | Lee .......................... | H04N 1/58 |
| | | | 382/269 |
| 2010/0070549 A1 | 3/2010 | Nagaraj | |
| 2015/0312499 A1* | 10/2015 | Panicacci ............... | H04N 25/78 |
| | | | 348/251 |
| 2023/0176820 A1 | 6/2023 | Wei et al. | |

FOREIGN PATENT DOCUMENTS

WO 2022/042065 A1 3/2022

* cited by examiner

*Primary Examiner* — Mark T Monk
(74) *Attorney, Agent, or Firm* — Sughrue Mion, PLLC

(57) ABSTRACT

An image sensing device includes a pixel array including a photoconverter configured to convert optical signals into analog electrical signals, an analog-digital converting (ADC) circuit configured to convert the analog electrical signals received from the pixel array into digital signals, an address bus, a random number generator configured to generate random numbers based on an input of least significant bits (LSBs) of a plurality of digital signals transmitted from the ADC circuit through the address bus, and a signal processor configured to perform image processing using the random numbers.

19 Claims, 25 Drawing Sheets

FIG. 2

(a) Image of high brightness (b) histogram (c) Probability of LSB (c) Probability of LSB (b) histogram (a) Image of low brightness

GENERATE A PLURALITY OF ANALOG SIGNALS FROM PIXEL ARRAY — S100

CONVERT THE PLURALITY OF ANALOG SIGNALS TO DIGITAL SIGNALS — S200

GENERATE M RANDOM SEED NUMBERS ACCORDING TO BRIGHTNESS AND/OR GAIN BASED ON N LSBS OF THE DIGITAL SIGNALS — S300

GENERATE RANDOM NUMBERS BASED ON M RANDOM SEED NUMBERS — S400

GENERATE A PLURALITY OF ANALOG SIGNALS
FROM PIXEL ARRAY — S100

CONVERT THE PLURALITY OF ANALOG SIGNALS
TO DIGITAL SIGNALS — S200

GENERATE M RANDOM SEED NUMBERS ACCORDING TO
BRIGHTNESS AND/OR GAIN BASED ON N LSBS OF
THE DIGITAL SIGNALS — S300

GENERATE RANDOM NUMBERS BASED ON
M RANDOM SEED NUMBERS — S400

PERFORM IMAGE PROCESSING USING
RANDOM NUMBERS — S500

FIG. 18

| 1.8 | 1.8 | 1.8 | 1.8 | 1.8 | 1.8 | 1.8 | 1.8 |
|-----|-----|-----|-----|-----|-----|-----|-----|
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |

Input image
E(Input image)=1.8

Simple Rounding →

| 2 | 2 | 2 | 2 | 2 | 2 | 2 | 2 |
|---|---|---|---|---|---|---|---|
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |

Output image
E(Output image)=2

FIG. 19

Output image
E(Output image)=1.7969

| 2 | 2 | 2 | 2 | 2 | 2 | 1 | 1 |
|---|---|---|---|---|---|---|---|
| 2 | 2 | 2 | 2 | 2 | 2 | 1 | 1 |
| 2 | 2 | 2 | 2 | 2 | 2 | 1 | 1 |
| 2 | 2 | 2 | 2 | 2 | 2 | 1 | 1 |
| 2 | 2 | 2 | 2 | 2 | 2 | 1 | 1 |
| 2 | 2 | 2 | 2 | 2 | 2 | 2 | 1 |
| 2 | 2 | 2 | 2 | 2 | 2 | 1 | 1 |
| 2 | 2 | 2 | 2 | 2 | 2 | 2 | 1 |

Stochastic Rounding

| 0.02 | 0.03 | 0.05 | 0.06 | 0.08 | 0.09 | 0.11 | 0.13 |
|------|------|------|------|------|------|------|------|
| 0.14 | 0.16 | 0.17 | 0.19 | 0.2 | 0.22 | 0.23 | 0.25 |
| 0.27 | 0.28 | 0.3 | 0.31 | 0.33 | 0.34 | 0.36 | 0.38 |
| 0.39 | 0.41 | 0.42 | 0.44 | 0.45 | 0.47 | 0.48 | 0.5 |
| 0.52 | 0.53 | 0.55 | 0.56 | 0.58 | 0.59 | 0.61 | 0.63 |
| 0.64 | 0.66 | 0.67 | 0.69 | 0.7 | 0.72 | 0.73 | 0.75 |
| 0.77 | 0.78 | 0.8 | 0.81 | 0.83 | 0.84 | 0.86 | 0.88 |
| 0.89 | 0.91 | 0.92 | 0.94 | 0.95 | 0.97 | 0.98 | 1 |

Random value (Uniform Distribution)

Input image
E(Input image)=1.8

| 1.8 | 1.8 | 1.8 | 1.8 | 1.8 | 1.8 | 1.8 | 1.8 |
|-----|-----|-----|-----|-----|-----|-----|-----|
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |
| 1.8 | 1.8 | 1.8 | 1.8 | 1.8 | 1.8 | 1.8 | 1.8 |

FIG. 20

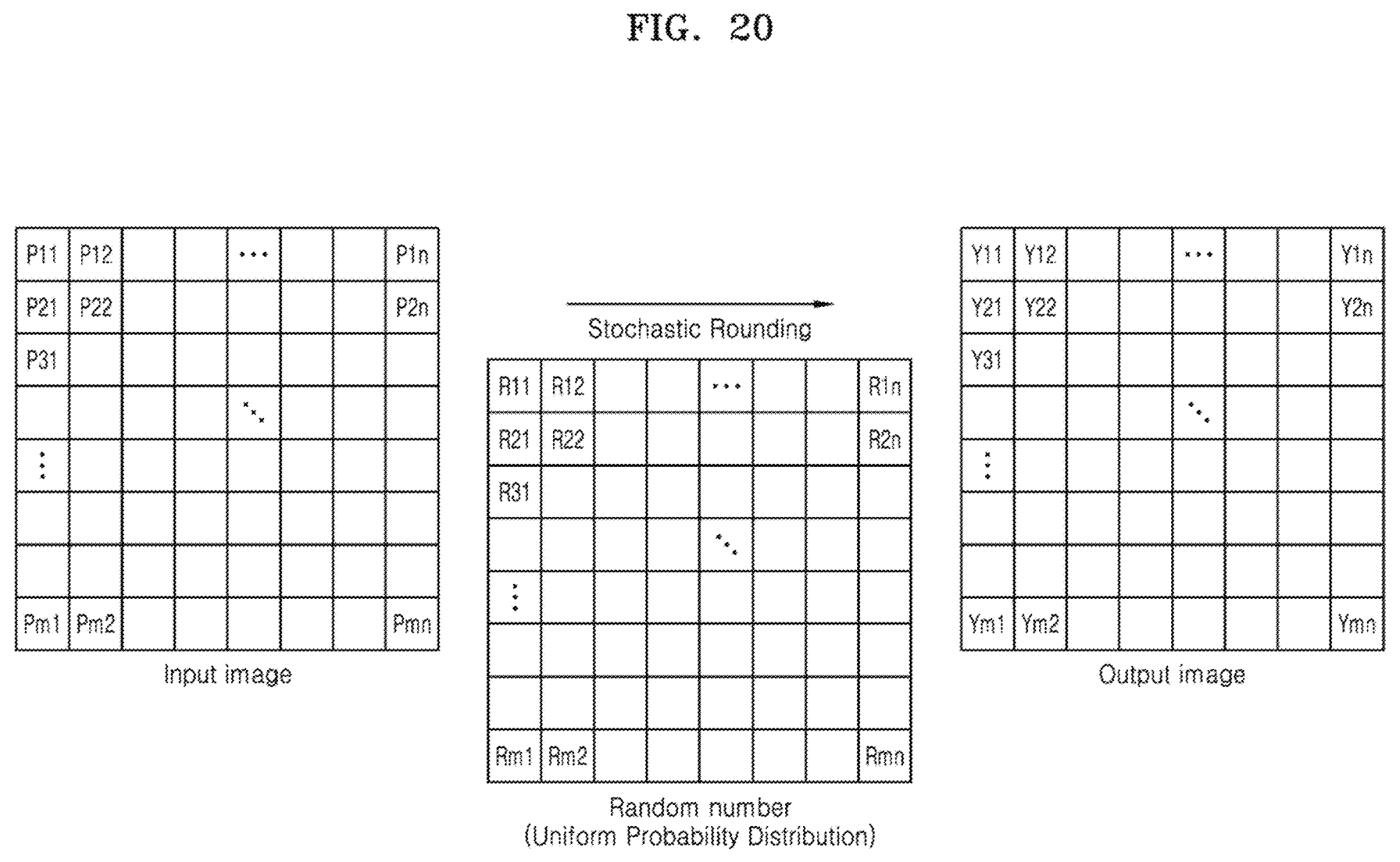

Output image

Y11 Y12 Y21 Y22 Y31 ··· Ym1 Ym2
Y1n Y2n Ymn

Stochastic Rounding

Random number
(Uniform Probability Distribution)

R11 R12 R21 R22 R31 ··· Rm1 Rm2
R1n R2n Rmn

Input image

P11 P12 P21 P22 P31 ··· Pm1 Pm2
P1n P2n Pmn (a) Fibbonacci (b) Galois (c) XOR Shift Register

RANDOM NUMBER GENERATOR FOR MULTICHANNEL IMAGE SENSING DEVICE

CROSS-REFERENCE TO RELATED APPLICATIONS

This application claims benefit of priority under 35 U.S.C. § 119 to Korean Patent Application No. 10-2023-0039161, filed on Mar. 24, 2023, and to Korean Patent Application No. 10-2023-0066494, filed on May 23, 2023, in the Korean Intellectual Property Office, the disclosures of which are incorporated by reference herein in their entireties.

BACKGROUND

1. Field

The present disclosure relates generally to an image sensing device, and more particularly, to a random number generator used in an image sensing device, a method of generating random numbers in the image sensing device, and an application method thereof.

2. Description of Related Art

An image sensing device (e.g., an image sensor) may refer to a semiconductor device that may convert optical signals into electrical signals. In a related camera device, a film may be exposed to light received through opening and closing of a shutter, and an image may be transferred by a chemical change of a material coated on the film.

Alternatively, an image sensing device may convert optical signals into electrical signals through a photoconverter. The electrical signals may be stored as data in a storage device and may be sent to a display to be output on a screen.

Typically, image sensors may include charge coupled devices (CCDs) and/or complementary metal oxide semiconductor (CMOS) image sensor (CIS) devices. Until recently, CCDs with good optical characteristics were widely used. Thereafter, through the application of pinned photodiodes and the development of noise reduction technology, CIS devices having a simpler structure and easier manufacturing have been widely used.

Image sensing devices may have been further improved by the application of various effects that may be implemented through image processing of the digitized signals in addition to further improvements of optical characteristics of the image sensing devices. To implement these various effects, higher performance and more logic circuits may have been incorporated into image sensing devices.

SUMMARY

The present disclosure provides a circuit for generating random numbers with high randomness even when implemented as a logic circuit in an image sensing device. The present disclosure also provides an image processing process for performing image processing using random numbers generated based on random seed numbers. To generate random numbers with high randomness, a circuit for generating random seed numbers is provided. In particular, a circuit for generating random seed numbers using a dark noise component with good randomness as a source is provided, and a method for securing randomness according to brightness or gain values of an image is also provided. Furthermore, an electronic device and a system including the image sensing device are provided.

According to an aspect of the present disclosure, an image sensing device includes a pixel array including a photoconverter configured to convert optical signals into analog electrical signals; an analog-digital converting (ADC) circuit configured to convert the analog electrical signals received from the pixel array into digital signals; an address bus; a random number generator configured to generate random numbers based on an input of least significant bits (LSBs) of a plurality of digital signals transmitted from the ADC circuit through the address bus; and a signal processor configured to perform image processing using the random numbers.

According to an aspect of the present disclosure, an random number generator includes a random seed number generator configured to receive N LSBs as input values, wherein N is a positive integer greater than one; and generate M random seed numbers based on the N LSBs and a mode value selected from among a plurality of mode values. The mode value is selected based on at least one of a brightness of an image and a gain of the image. M is a positive integer less than or equal to N. The random seed number generator is configured to generate the M random seed numbers by generating, based on the mode value being a first mode value, a random seed number by merging the N LSBs; generating, based on the mode value being a second mode value, the M random seed numbers by merging the N LSBs; and generating, based on the mode value being a third mode value, N random seed numbers without merging the N LSBs. The random number generator further includes a linear feedback shift register configured to generate a first random number based on the M random seed numbers.

According to an aspect of the present disclosure, an operating method of an image device includes generating a plurality of analog electrical signals by a pixel array including a plurality of photoconverters that convert optical signals into the plurality of analog electrical signals; converting the plurality of analog electrical signals generated by the pixel array into a plurality of digital signals; receiving N LSB values of the plurality of digital signals, N being a positive integer greater than one; generating M random seed numbers based on the N LSB values based on at least one of a brightness of an image and a gain of the image, wherein M is a positive integer less than or equal to N; and generating, by a linear feedback shift register, random numbers based on the M random seed numbers.

According to an aspect of the present disclosure, an image sensing device includes a pixel array including a cluster cell in which a plurality of pixels of a same color are disposed adjacently; an ADC circuit configured to convert a plurality of analog signals generated from the plurality of pixels into a plurality of digital signals; a random number generator configured to receive a plurality of LSBs of the plurality of digital signals and generate random numbers based on the plurality of LSBs; and a signal processor configured to perform image processing using the random numbers.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure may be more apparent from the following description taken in conjunction with the accompanying drawings, in which:

3

Figure 1:
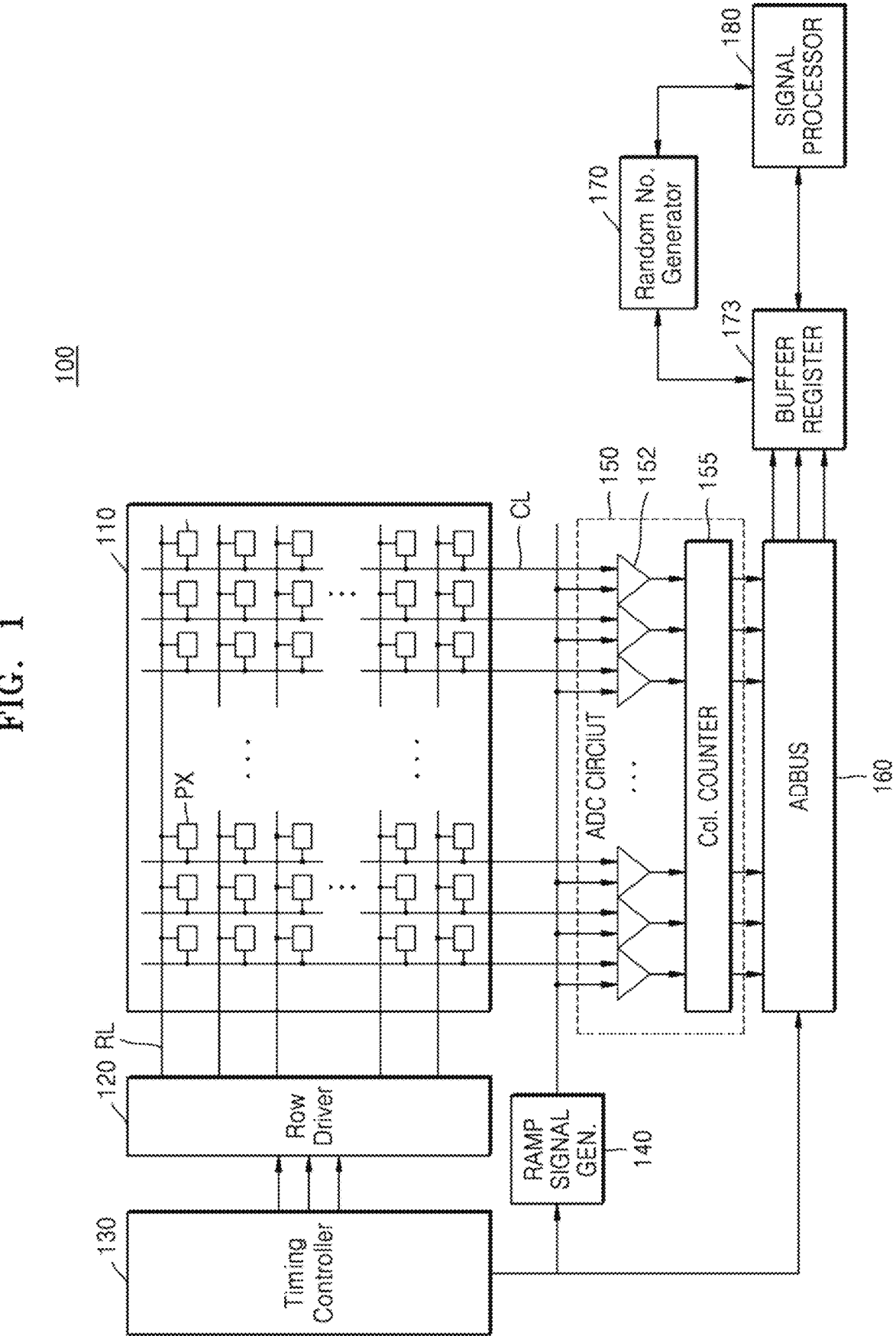
Figure 3:
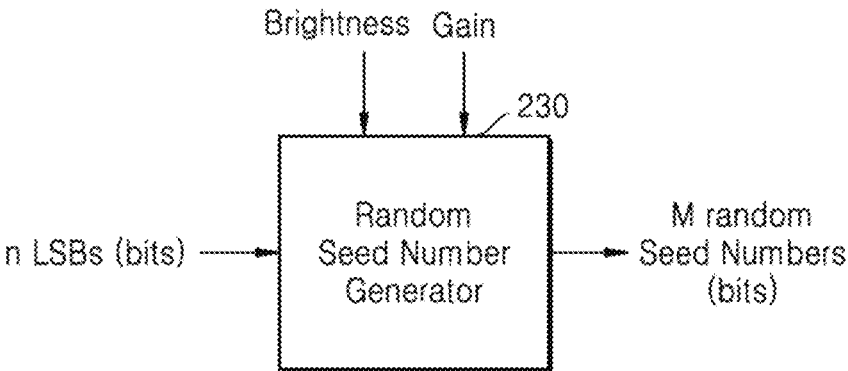
Figure 4:
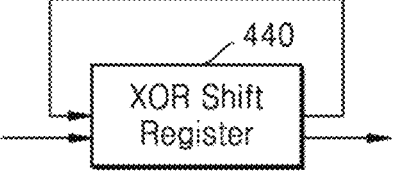
Figure 5A:
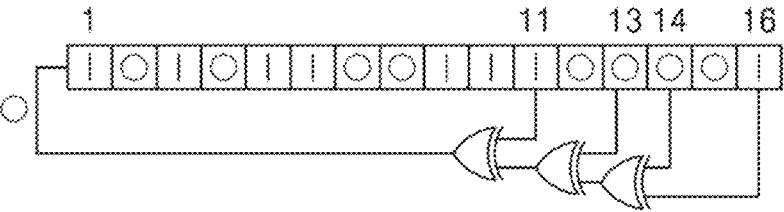
Figure 5B:
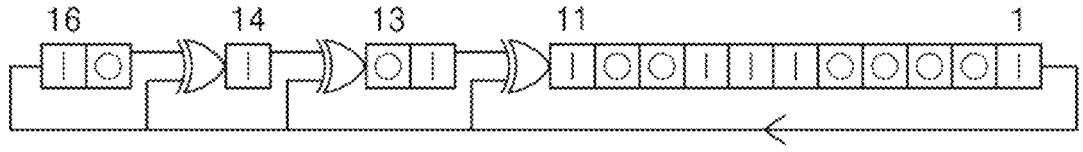
Figure 6:
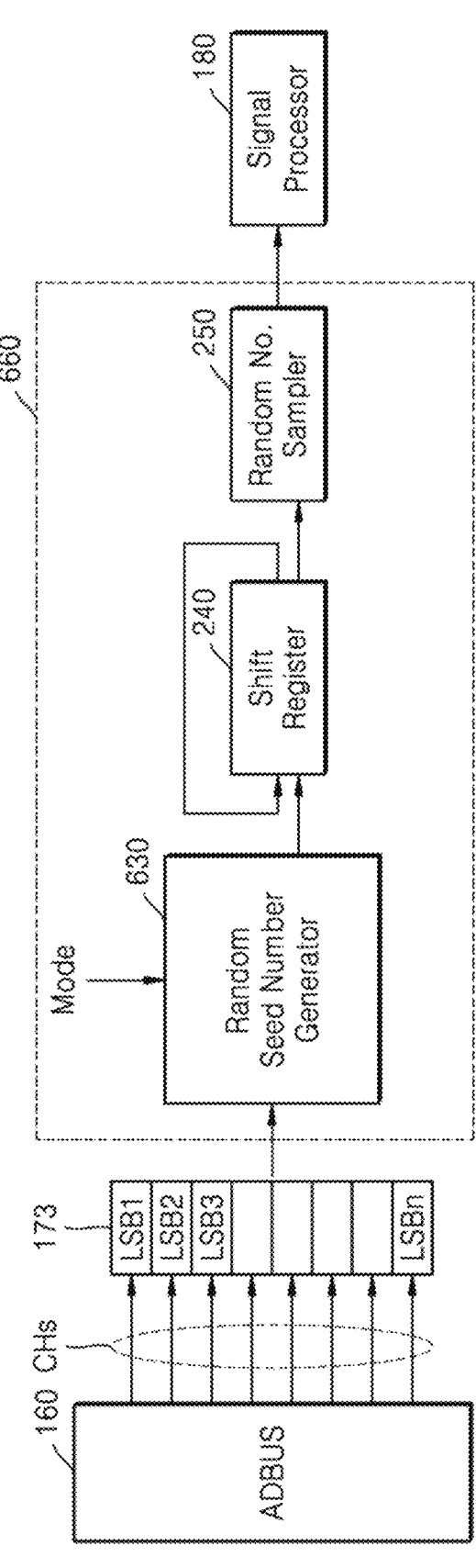
Figure 7:
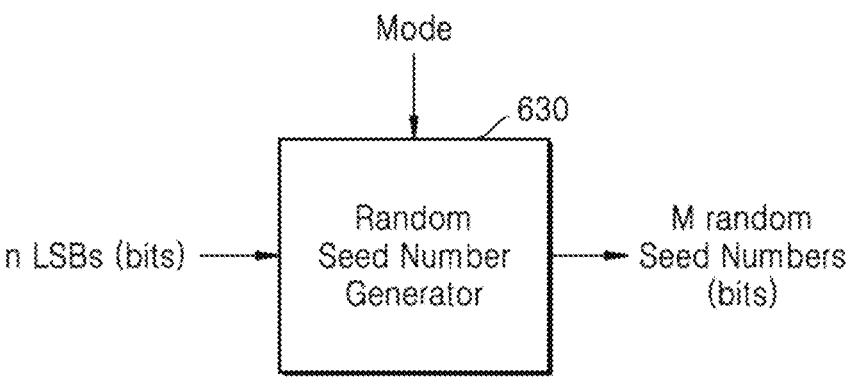
Figure 8:
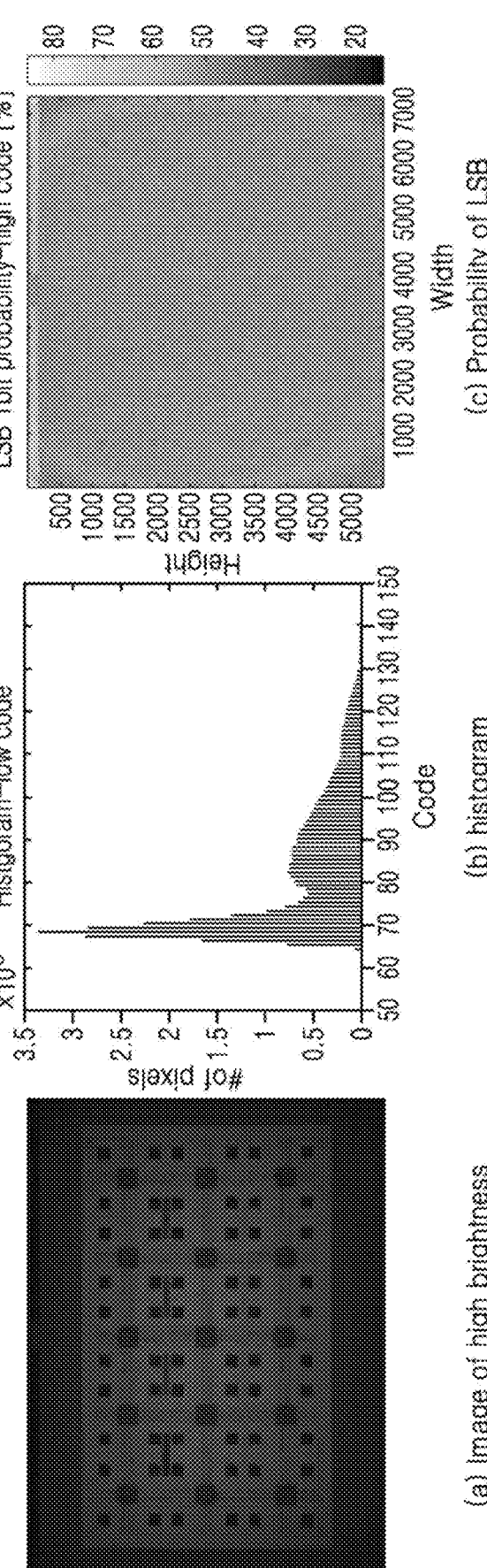
Figure 9:
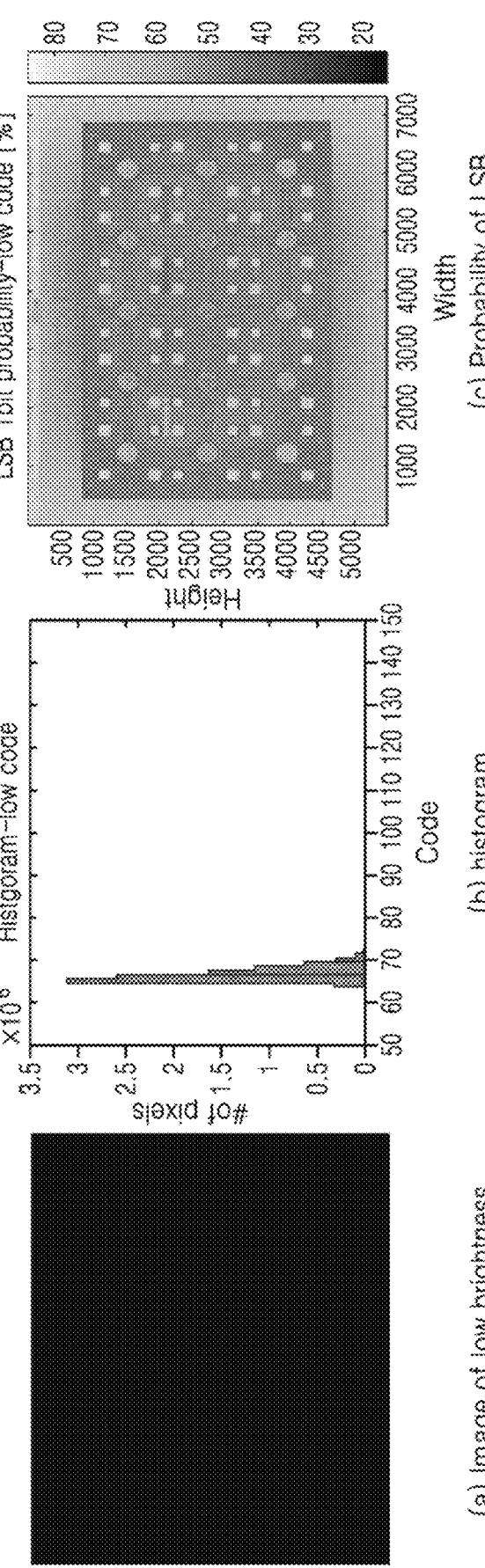
Figure 10:
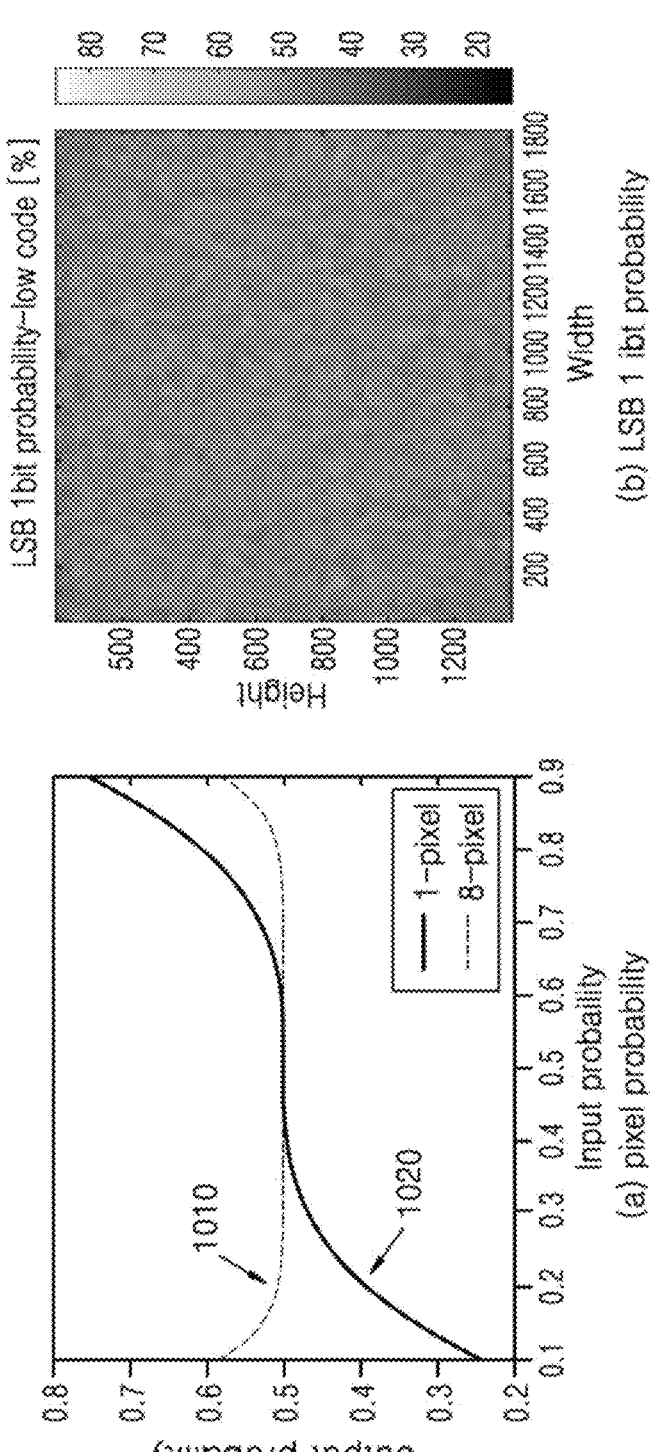
Figure 11:
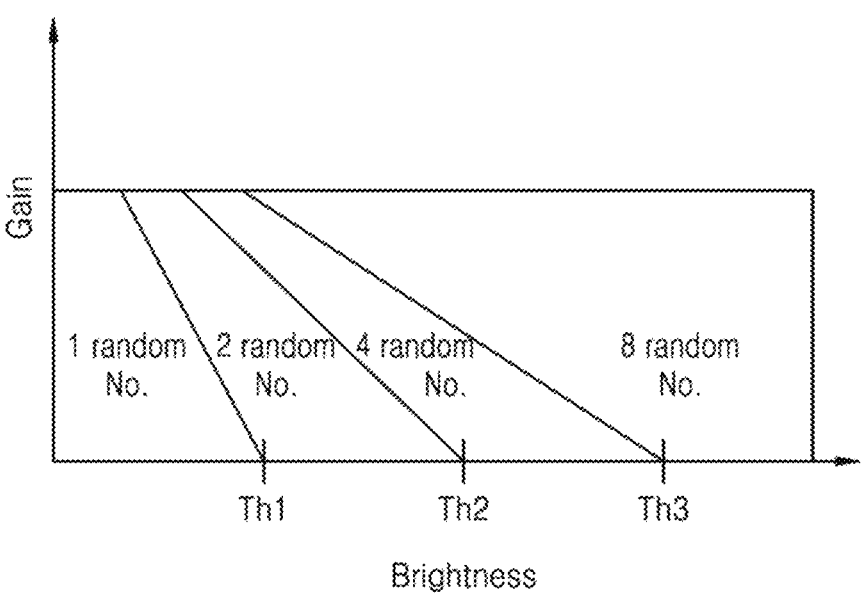
Figure 12:
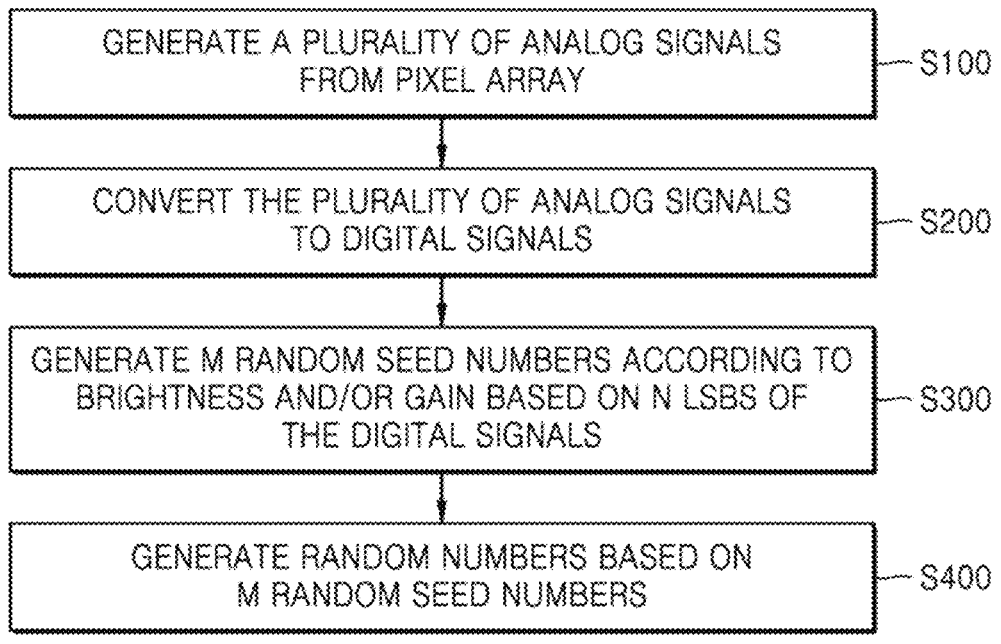
Figure 13:
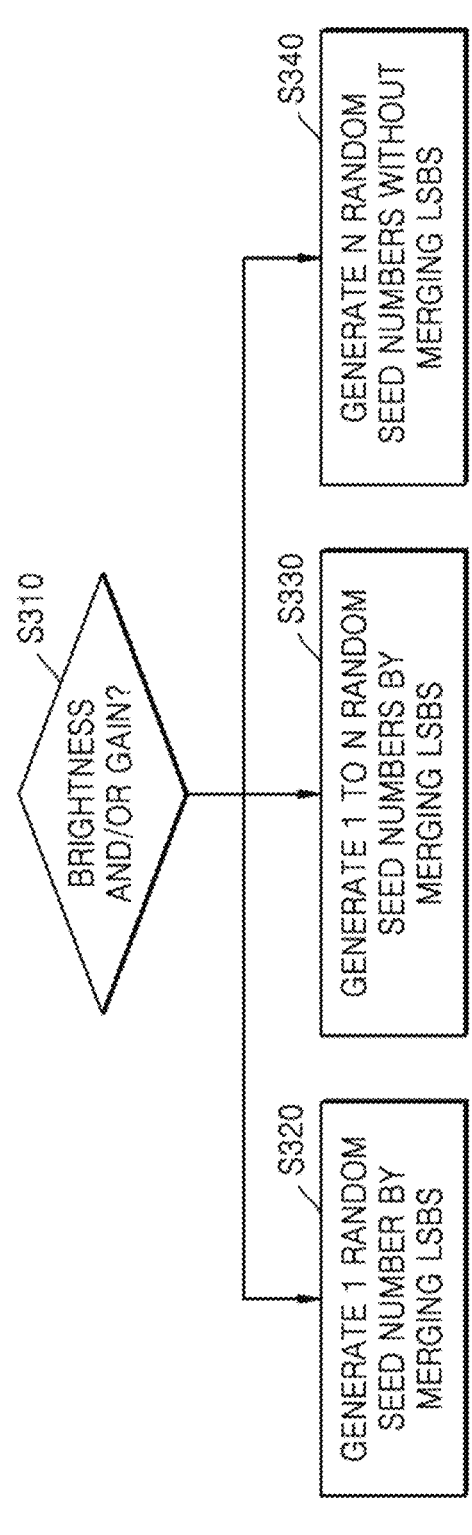
Figure 14:
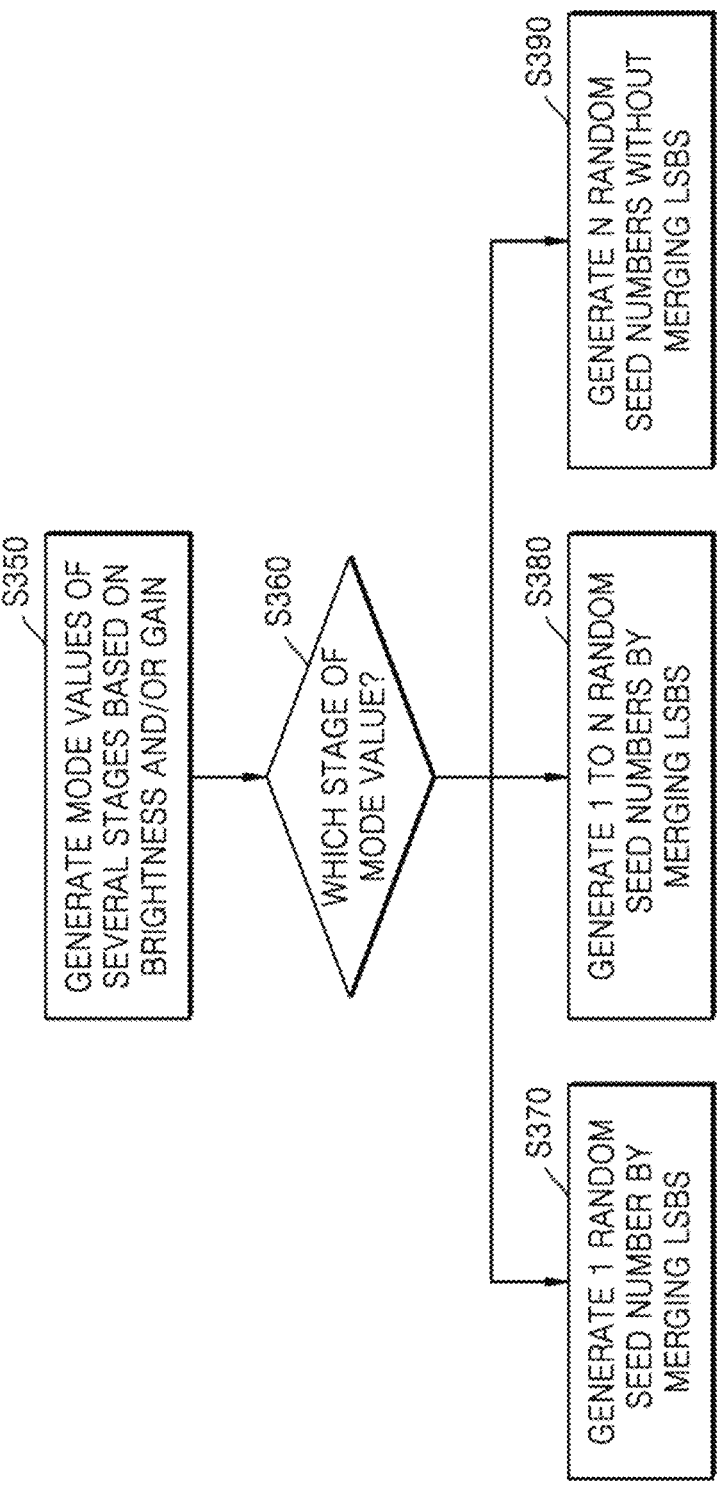
Figure 15:
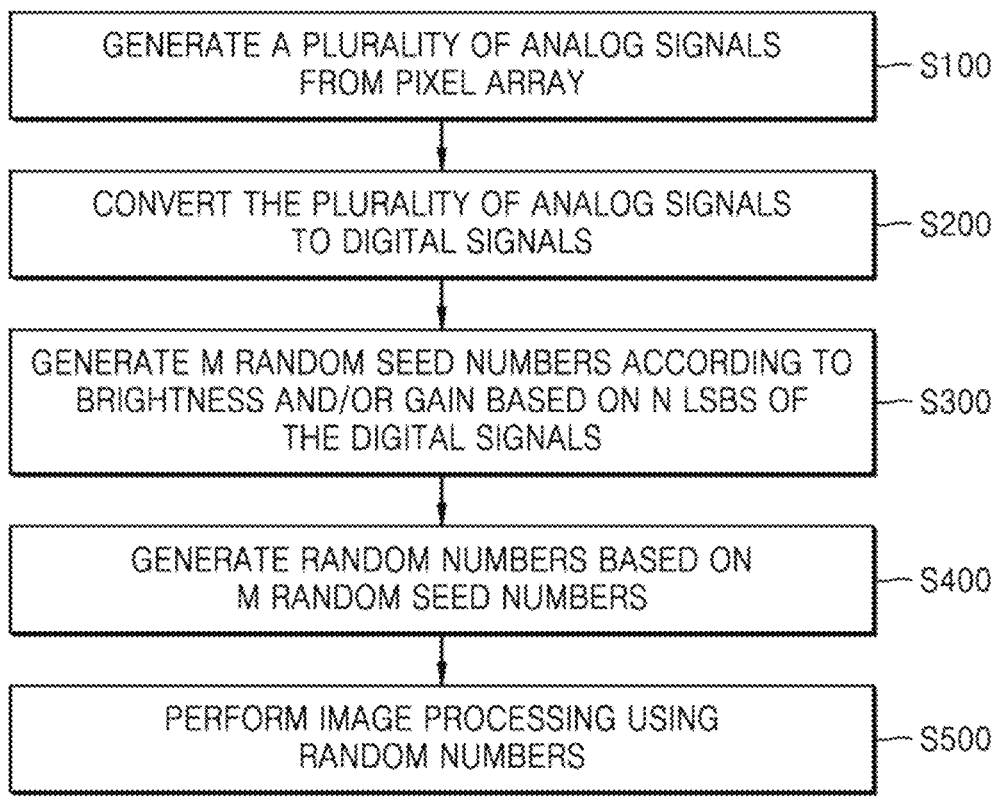
Figure 16:
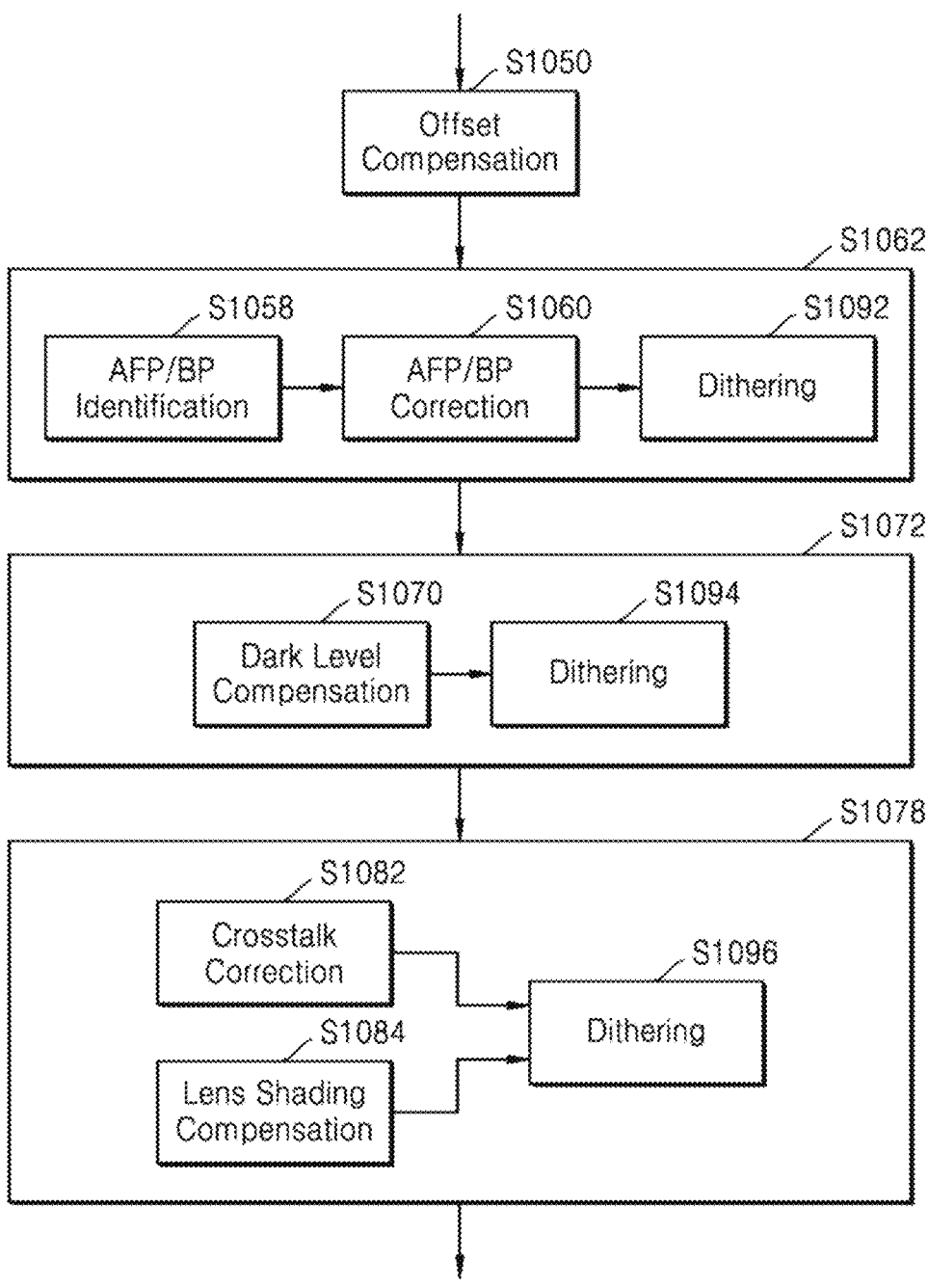
Figure 17:
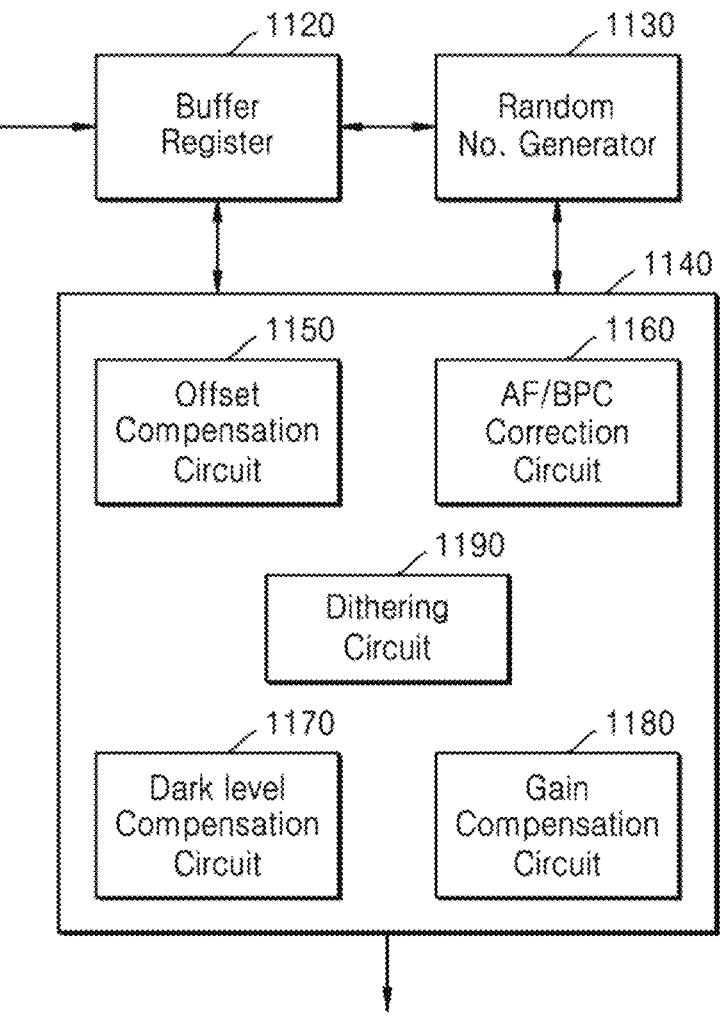
Figure 21:
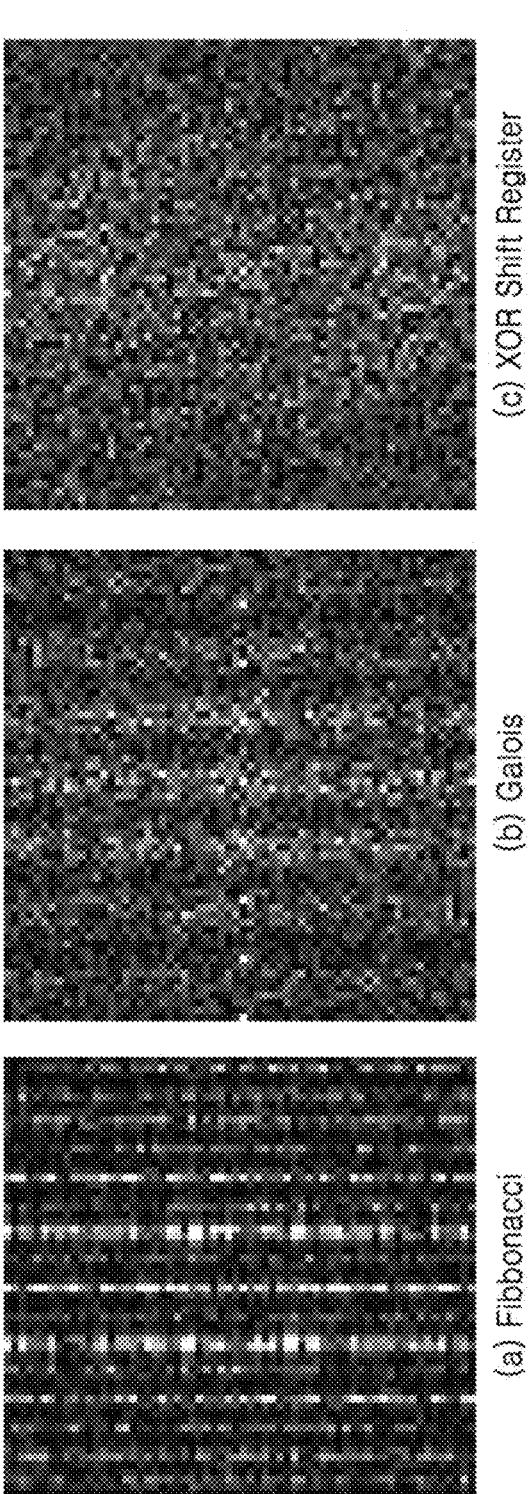
Figure 22:
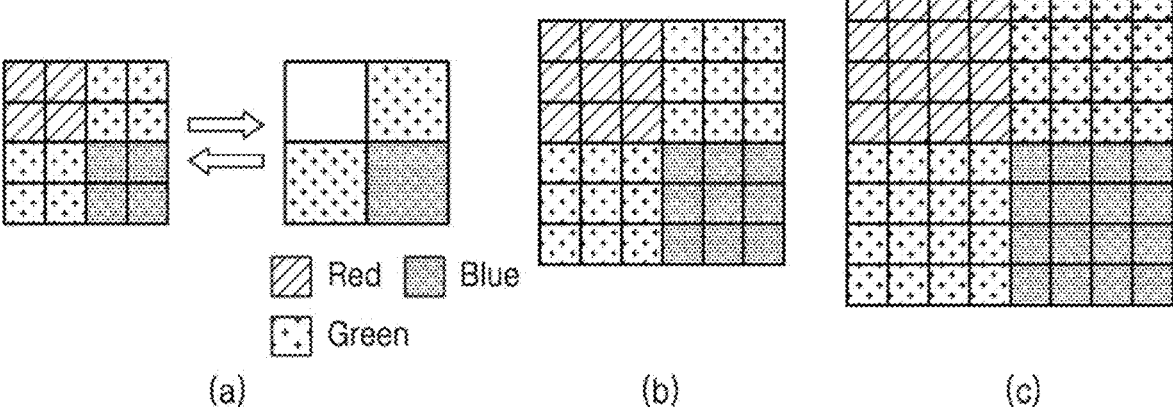
Figure 23:
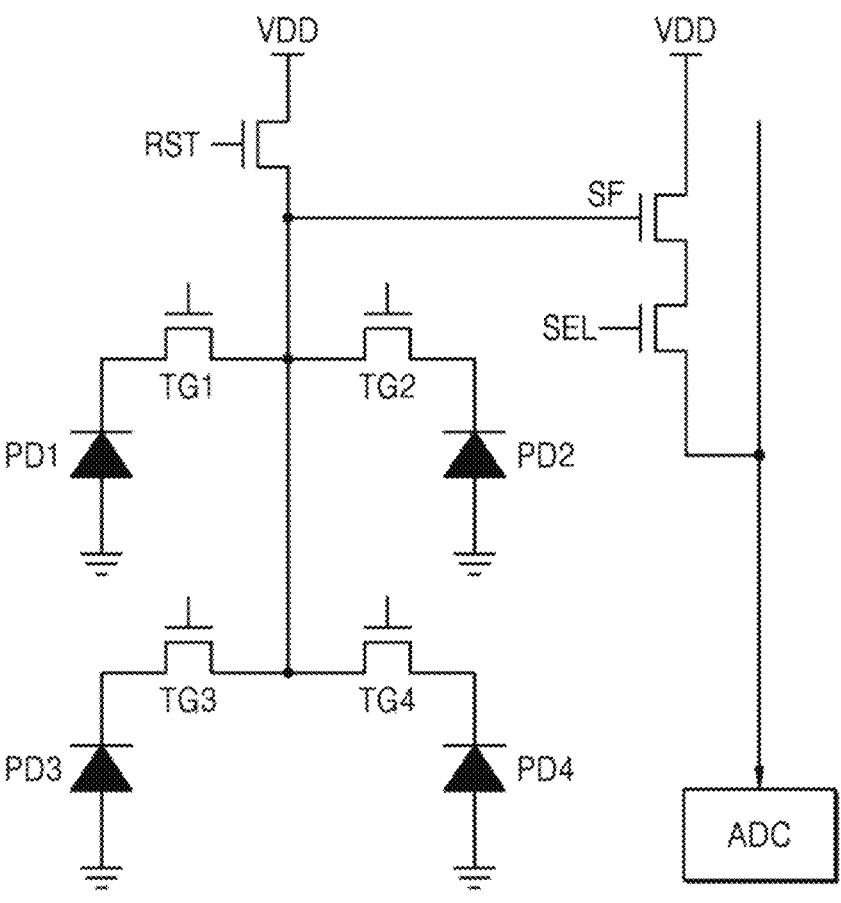
Figure 24:
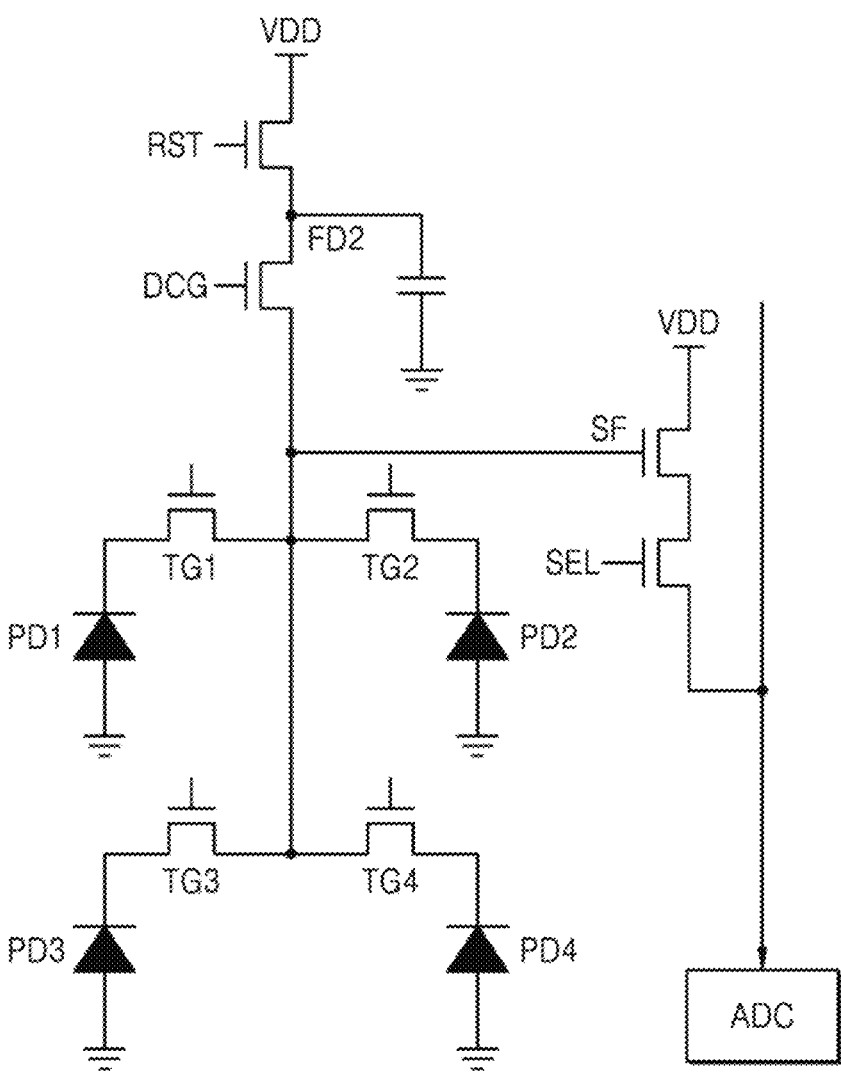

FIG. 1 is a block diagram of an image sensing device, according to an embodiment;

Figure 2:
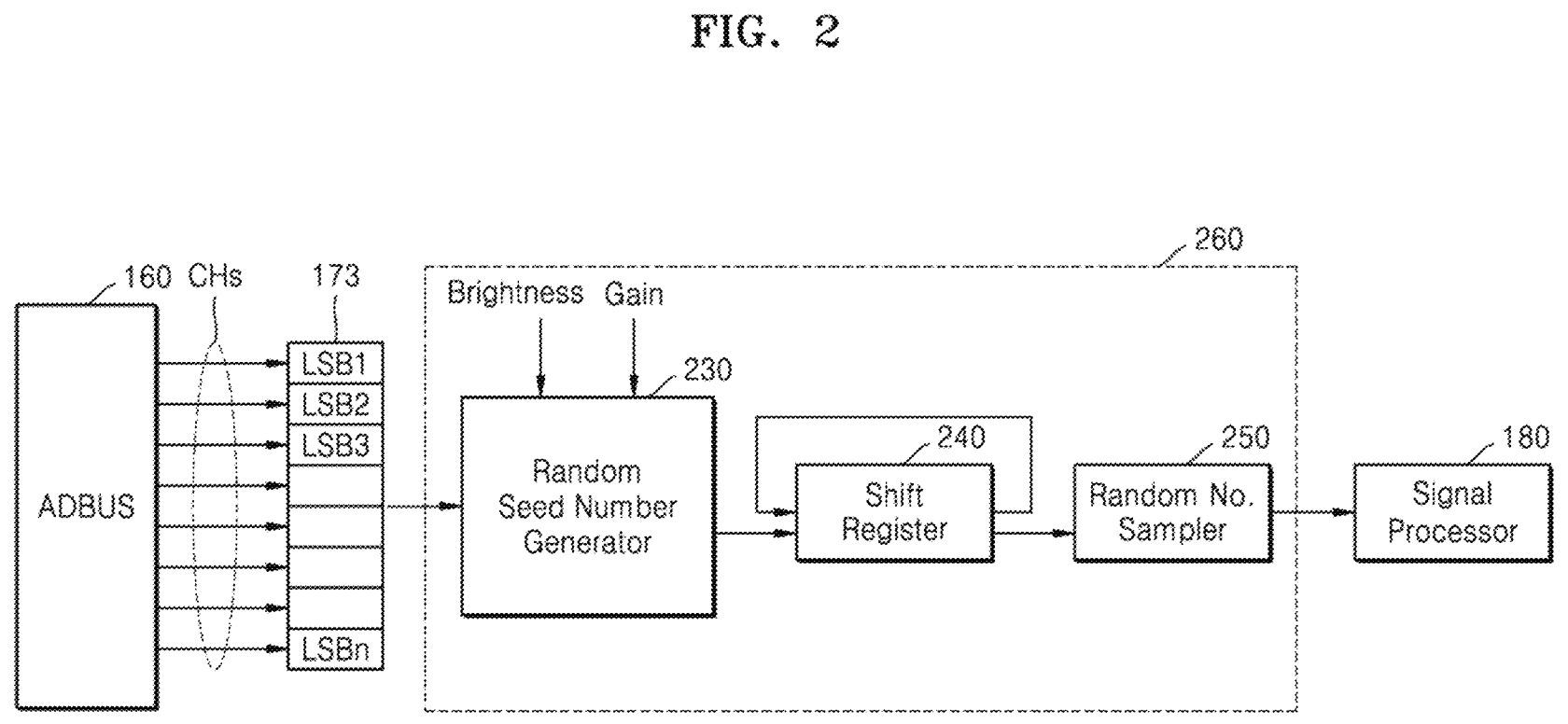

FIG. 2 is a block diagram showing a process of generating random numbers, according to an embodiment;

FIG. 3 is a block diagram of a random seed number generator, according to an embodiment;

FIG. 4 is a block diagram of an XOR shift register, according to an embodiment;

FIG. 5A is a diagram of a Fibonacci linear shift feedback register, according to an embodiment;

FIG. 5B is a diagram of a Galois linear feedback shift register, according to an embodiment;

FIG. 6 is a block diagram showing a process of generating random numbers. according to an embodiment;

FIG. 7 is a block diagram of a random seed number generator, according to an embodiment;

FIG. 8 depicts an image, a histogram, and a probability of least significant bit (LSBs) of an object photographed at a high brightness, according to an embodiment;

FIG. 9 depicts an image, a histogram, and a probability of LSB of the same object photographed at a low brightness, according to an embodiment;

FIG. 10 illustrates probability values when 1 LSB is extracted and when 8 LSBs are merged, according to an embodiment;

FIG. 11 is a diagram showing a method of generating one random number or a plurality of random numbers for each section divided based on brightness and gain, according to an embodiment;

FIG. 12 is a flowchart showing a scheme configuring an operation of an image sensing device, according to an embodiment;

FIG. 13 is a flowchart showing a scheme for forming random seed numbers of an image sensing device, according to an embodiment;

FIG. 14 is a flowchart showing a scheme for forming random seed numbers of an image sensing device, according to another embodiment;

FIG. 15 is a flowchart showing an operating method of an image sensing device including an image scheme using generated random numbers, according to an embodiment;

FIG. 16 is a block diagram showing image processing performed by a signal processor, according to an embodiment;

FIG. 17 is a block diagram showing blocks undergoing image processing by a signal processor, according to an embodiment;

FIG. 18 is a diagram showing average values before and after simple rounding is performed on pixel signal values, according to an embodiment;

FIG. 19 is a diagram showing average values before and after a stochastic rounding is performed using random numbers having a uniform distribution with respect to pixel signal values, according to an embodiment;

FIG. 20 is a diagram showing a process of performing stochastic rounding using random numbers generated by a random number generator, according to an embodiment;

FIG. 21 illustrates frequency response images generated using a Fibonacci feedback shift register, a Galois shift register, and an XOR shift register, according to an embodiment;

FIG. 22 are diagrams of cluster cells, including a tetracell, a nonacell, and a hexacell, according to an embodiment;

FIG. 23 is a circuit diagram of four shared pixels as a tetracell, according to an embodiment;

FIG. 24 is a circuit diagram of four shared pixels as a tetracell, according to an embodiment; and

4

Figure 25:
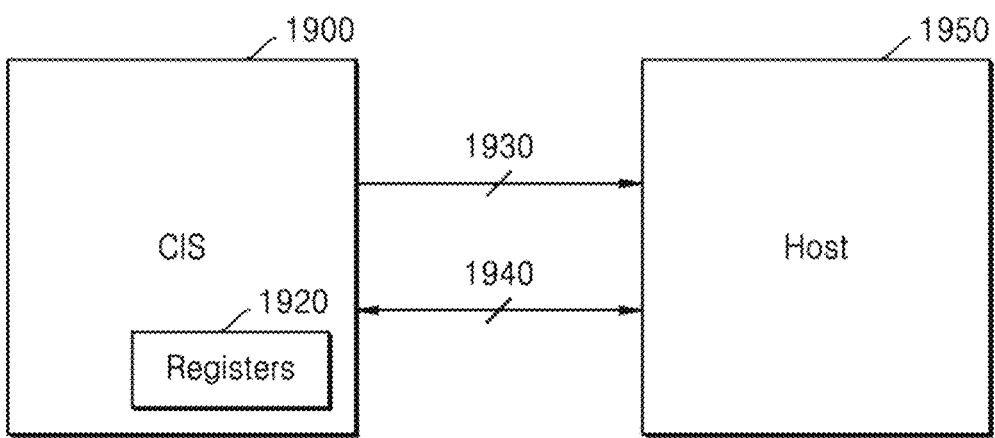

FIG. 25 is a block diagram showing data transmission between an image sensing device and a host, according to an embodiment.

DETAILED DESCRIPTION

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it may be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", and the like may be replaced with terms, such as "first," "second," third" to be used to describe relative positions of elements. The terms "first," "second," third" may be used to describe various elements but the elements are not limited by the terms and a "first element" may be referred to as a "second element". Alternatively or additionally, the terms "first", "second", "third", and the like may be used to distinguish components from each other and do not limit the present disclosure. For example, the terms "first", "second", "third", and the like may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

In image sensing devices, implementation of high resolution by increasing the number of pixels, miniaturization of devices through high integration, fast processing of high integration, and image processing may be increasing in importance. For example, various image processing operations may be performed to attempt to improve the quality of signals generated from pixels such as, but not limited to, improving a signal-to-noise ratio, denoising, and the like. In an image sensing device and/or a camera device including the same, image processing may increase in importance because the image processing may enable users to fully realize the optical properties of the image sensing device and/or to potentially improve image quality.

In aspects of the present disclosure, random numbers may be used for image processing of a signal processor. For example, the random numbers may be used for dithering of the signal processor. As used herein, dithering may refer to an operation process that removes the value of the decimal bits of the preprocessed signal and converts the value into an integer value. That is, dithering may refer to a quantization process. In the quantization process, a signal loss due to a difference from the preprocessed signal may occur, and the characteristics and distribution of the original analog signal may be followed and/or approximated to attempt to compensate for the quantization loss, and thereby, potentially minimize the signal loss. Stochastic rounding may be performed when the quantization process is performed to minimize the signal loss. Aspects of the present disclosure may provide for using random numbers to perform the stochastic rounding.

Hereinafter, various embodiments of the present disclosure are described with reference to the accompanying drawings.

FIG. 1 is a block diagram of an image sensor, according to an embodiment.

Referring to FIG. 1, an image sensor 100 may include a pixel array 110, a row driver 120, a timing controller 130, a ramp signal generator 140, an analog-to-digital converting (ADC) circuit 150, an address bus (ADBUS) 160, a random number generator 170, and a signal processor 180.

The pixel array 110 may include a plurality of pixels PX, a plurality of column lines CL, and a plurality of row lines RL. The plurality of pixels PX may be arranged in a plurality of rows and a plurality of columns. Each of the plurality of column lines CL and the plurality of row lines RL may be connected (communicatively coupled) to the plurality of pixels PX. Each pixel PX may include a photodiode as a light-receiving element, and may also include an analog circuit. The analog circuit may include transfer gate transistors (e.g., TG in FIG. 23), a reset gate transistor (e.g., RST in FIG. 23), floating diffusion regions (e.g., FD in FIGS. 23A and 23B), a source follower (e.g., SF in FIGS. 23B and 23C), and a select transistor (e.g., SEL in FIG. 23C). The photodiode may collect (generate) a charge according to the intensity of received light. The analog circuit may quantitatively convert the collected charge into an analog electrical signal and transmit the analog signal to the ADC circuit 150.

In the present disclosure, a complementary metal oxide semiconductor (CMOS) image sensor (CIS) device may be referred to as an image device. However, the scope of the present disclosure is not limited to the CIS device. For example, a charge coupled device (CCD) device may be included in the scope of the present disclosure unless otherwise specifically limited.

The timing controller 130 may control the operation of other circuits such as, but not limited to, the row driver 120 and the ramp signal generator 140. The analog circuits of the pixels PX in the pixel array 110 may be controlled by the row driver 120 for each row line RL. For example, the row driver 120 may activate the pixels PX connected to the row line RL of the pixel array 110 according to a clock signal generated by the timing controller 130. In an embodiment, the timing controller 130 may sequentially activate the plurality of row lines RL, and the pixels PX connected to the row lines RL.

The analog signals generated from the pixels PX may be transmitted as pixel signals to the ADC circuit 150 connected to the column lines CL. The ADC circuit 150 may convert the pixel signals into digital pixel data. The ADC circuit 150 may include a plurality of comparators 152 and a column counter 155. The column counter 155 may include a plurality of counters corresponding to the plurality of comparators 152. The ramp signal generator 140 may generate a ramp signal that goes downward and/or upward (e.g., decrease and/or increase a voltage level) with a constant gradient.

Each of the plurality of comparators 152 may compare a corresponding pixel signal of the plurality of pixel signals output from the pixel array 110 with the ramp signal. When the ramp signal is greater than the pixel signal, the comparator 152 may output a signal of a first level (e.g., a high level), and when the ramp signal is less than or equal to the pixel signal, the comparator 152 may output a signal of a second level (e.g., a low level). However, the present disclosure is not limited in this regard. For example, the comparator 152 may output a low level signal when the ramp signal is greater than the pixel signal, and may output a high level signal when the ramp signal is less than or equal to the pixel signal.

The column counter 155 may generate the digital signal corresponding to the pixel signal. The column counter 155 may count clock signals until the ramp signal meets the pixel signal, and based on a counted clock value, the pixel signal may be converted as a digital code. The column counter 155 may output the digital code as the digital signal corresponding to the pixel signal.

Although the same pixel signal is input to the comparators 152, the point at which the pixel signal meets the ramp signal may be different according to the gradient of the ramp signal. For example, when the gradient of the ramp signal is increased, the value of the output digital signal may decrease, and when the gradient of the ramp signal is decreased, the value of the output digital signal may increase. The magnitude of the signal output by the ADC circuit 150 may be adjusted according to a brightness of the image generated by the image sensor 100 and/or the surrounding illuminance of the device on which the image sensor 100 is mounted. As used herein, the value controlled by the ADC circuit 150 to adjust the signal output by the ADC circuit 150 may be referred to as a gain. Alternatively or additionally, a value for adjusting a signal value for image processing in the signal processor 180 may be referred to as a digital gain.

The size of the digital code (e.g., a bit depth and/or a bit length of the digital code) may be adjusted according to the hardware performance and function of the image sensor 100, and/or other design constraints. In an exemplary embodiment, the bit length of the digitally converted pixel signal may be varied according to the performance of the image sensor, the hardware intellectual property (IP), and the user (e.g., performance of application processor (AP) and compatibility with AP), but is not limited thereto. For example, the bit length of the digital code generated by the column counter 155 may be designed to be any bit value between eight (8) and 13 bits. As another example, the bit length of the digital code generated by output from the column counter 155 may be 10 bits or 12 bits. However, the present disclosure is not limited in this regard and the bit length of the digital code may be set to other values without departing from the scope of the present disclosure.

A plurality of pixel data signals (e.g., a plurality of digital signals corresponding to a plurality of pixel signals from the pixel array 110) generated by the column counter 155 may be transmitted to the signal processor 180 through the ADBUS 160. The ADBUS 160 may be a path through which the plurality of pixel data signals in the image sensor 100 are transmitted. The plurality of pixel data signals converted into digital signals by the ADC circuit 150 may be transmitted to the signal processor 180 through the ADBUS 160.

In an exemplary embodiment, each pixel data signal input to the ADBUS 160 may be transmitted to the signal processor 180 through one of multiple channels (e.g., CHs in FIG. 2). In an exemplary embodiment, the plurality of pixel data signals may be provided to the signal processor 180 through the multiple channels. When multichannel transmission is performed, the bit codes of the plurality of pixel data signals may be simultaneously transmitted in parallel, so that the speed of the image sensor 100 may be improved.

For example, the number of the multiple channels may be eight (8) or 16, and may vary depending on hardware design and required performance of the image sensor 100, and AP performance and compatibility. The present disclosure may be described with reference to eight (8) channels, but the scope of the present disclosure is not limited thereto. That is, aspects of the present disclosure may be applied to embodiments in which the number of channels may be less than eight (e.g., <8) and/or the number of channels may be greater than eight (e.g., >8).

The image sensor 100 may include a register 173 (also referred to as a buffer register) for receiving and/or sending pixel data signals and performing image processing. The pixel data signals received from the ADBUS 160 through multiple channels may be stored in the register 173 in units of bits. The register 173 may latch up and store the bit values from the ADBUS 160, and transmit the stored bit values to the random number generator 170 and/or the signal processor 180.

The signal processor 180 may perform various image processing operations for potentially improving the quality of the signals generated from the pixels PX, such as, but not limited to, improving a signal-to-noise ratio, denoising, and the like.

For example, the image processing performed by the signal processor 180 may include performing an operation such improving a signal-to-noise ratio for enhancing signals while suppressing noise when photographing at night or in a dark place, auto-focusing processing by creating a special pixel and measuring/adjusting left and right phase differences through the special pixel, and the like.

In an embodiment, the signal processor 180 may perform image processing that may include, but not be limited to, offset compensation, auto-focus pixel and/or bad pixel identification, dark level compensation, and digital gain compensation.

Random numbers may be used for image processing of the signal processor 180. For example, the random numbers may be used for dithering of the signal processor 180. As used herein, dithering may refer to an operation process that may remove the value of the decimal bits of the preprocessed signal and may convert the value into an integer value. That is, dithering may refer to a quantization process. In the quantization process, a signal loss due to a difference from the preprocessed signal may occur, and the characteristics and distribution of the original analog signal may be followed and/or approximated to attempt to compensate for the quantization loss, and thereby, potentially minimize the signal loss. Stochastic rounding may be performed when the quantization process is performed to minimize the signal loss. In an embodiment, random numbers may be used to perform stochastic rounding.

To generate random numbers in the imaging sensor 100, both the random number generator 170 and the random seed numbers may be considered. The random seed numbers may be initial values that may be input to the random number generator 170 to initialize and/or configure the random number generator 170. In an embodiment, a degree (or level) of randomness of the random seed numbers may affect the degree (or level) of randomness of the random numbers generated by the random number generator 170. For example, an increase in the degree of randomness of the random seed numbers may result in an increased degree of randomness in the random numbers generated by the random number generator 170.

As used herein, dark noise may refer to a statistical variation in the number of electrons thermally generated within a pixel in a photon-independent fashion. As such, in the image sensor 100, dark noise may ensure a randomness in the plurality of pixel signals output from the pixel array 110 since there may be substantially none to very low correlation between the plurality of pixels PX. Therefore, in the image sensor 100, dark noise may be assumed to have a relatively high degree of randomness, and consequently, may be used as a random seed number. In an embodiment, the LSB (Least Significant Bit) of the pixel digital signal may reflect the dark noise and may be used as a random seed number.

FIG. 2 is a block diagram showing a process of generating random numbers, according to an embodiment. Referring to FIG. 2, the random number generator 260 may include the random seed number generator 230 and the shift register 240. The random number generator 260 may also include a random number sampler 250. The random number generator 260 may include and/or may be similar in many respects to the random number generator 170 described above with reference to FIG. 1, and may include additional features not mentioned above. The random number generator 260 may receive the pixel digital signals transmitted from the ADBUS 160 as input values to generate random numbers, and the signal processor 180 may use the generated random numbers to perform image processing.

As shown in FIG. 2, the shift register 240 may generate random numbers by using the random seed numbers generated by the random seed number generator 230.

The shift register 240 may include a linear feedback shift register (LFSR). The LFSR may generate a random number, with a system including a logic circuit including an XOR gate and a feedback system. A linear feedback circuit may implement a pseudo-random number similar to a random number. As used herein, a random number may include a complete random number and/or a pseudo-random number.

As described with reference to FIG. 2, in an embodiment, n pixel digital signals may be stored in the register 173 for each bit code through n channels from the ADBUS 170, wherein n is a positive integer greater than zero (0) (e.g., eight (8)). The random seed number generator 230 may receive the input of n LSBs (e.g., first LSB1 to n-th LSBn) of the bit codes stored in the register 173 and generate random seed numbers based on the n LSBs. Although the present disclosure focuses on embodiments in which the number of channels (e.g., n) and the corresponding number of LSBs is eight (e.g., n=8), the present disclosure is not limited in this regard. That is, aspects of the present disclosure may be applied to embodiments in which the number of channels and/or the number of LSBs is less than eight (8) (e.g., n<8) and/or greater than eight (8) (e.g., n>8).

In an exemplary embodiment, the shift register 240 may include one of an XOR register (as shown in FIG. 4), a Fibonacci LFSR (as shown in FIG. 5A), and a Galois register LFSR (as shown in FIG. 5B). However, the present disclosure in not limited in this regard. Notably, the aspects presented herein may be implemented with any shift register with relatively low complexity and a relatively small logic size.

In an embodiment, the shift register 240 may generate random numbers by linearly shifting the initial seed values in a horizontal direction, and as such, the correlation between the preceding and following frames may be low particularly when compared to the circuit complexity and to the data size to be processed. In such an embodiment, pattern artifacts of an image may be visible. Such artifacts may be more visible when pixel data signals are transmitted through multiple channels rather than through a single channel.

FIG. 21 illustrates frequency response images generated using a Fibonacci feedback shift register, a Galois shift register, and an XOR shift register, according to an embodiment.

For example, (a) of FIG. 21 depicts an example image obtained by creating random seed numbers based on the pixel digital signals received through the multiple channels, creating random numbers using the Fibonacci LFSR, and transferring data obtained by sampling the generated random numbers in a certain size (e.g., the final random numbers) to the screen. As another example, (b) of FIG. 21 depicts an example image obtained by creating random numbers using the Galois LFSR and transferring data to the screen.

As shown in (a) and (b) of FIG. 21, visible artifacts may occur in a vertical direction. In the image sensor, when random numbers are generated using the pixel data signals transmitted through the multiple channels as seed numbers, correlation between the random numbers increases and randomness deteriorates.

In an embodiment, the random seed number generator 230 may generate random seed numbers based on the LSBs of the pixel digital signals. Since the LSBs of the pixel digital signals reflect shot noise (e.g., a dark noise component) the LSBs may have random properties. Therefore, the LSBs may be used as random seed numbers. However, since the signal-to-noise ratio is not high at low brightness and the LSBs may include non-random noise (e.g., readout noise) as well as random noise (e.g., dark noise) at the low brightness, randomness of the LSBs may deteriorate.

The randomness of the LSBs according to the brightness may be confirmed by comparing an image obtained by photographing an object at high brightness (see FIG. 8) and an image obtained by photographing the same object at low brightness (see FIG. 9).

Referring to FIG. 8, image (a) is an image of an object captured at high brightness, graph (b) is a pixel histogram of image (a), and graph (c) is a probability diagram of the LSBs of image (a). In the pixel histogram (b), the x-axis value may represent a bit code value of the image (a), and the y-axis value may represent the number of image pixels with the bit code value. In the probability diagram (c), the x-axis value and the y-axis value may represent the coordinates of the image (a), and the colors may reflect the probability values.

Referring to FIG. 8, the image (a) captured at high brightness and the pixel histogram (b) showing the pixel distribution for each code, show that random dark noise (e.g., shot noise) is predominant in the low code. Consequently, the probability of the LSBs in graph (c) also shows a uniform aspect.

Referring to FIG. 9, image (a) is an image of the same object of FIG. 8 captured at high brightness, graph (b) is a pixel histogram of image (a), and graph (c) is a probability diagram of the LSBs of image (a). The histogram (b) of the image captured at low brightness is concentrated on low code values. In addition, as shown in graph (c), the probability diagram of the LSBs reflects the image shape of the object. At low brightness, a readout noise component as well as dark noise may be included in a low code including the LSBs, and an image signal component may be included. Therefore, the probability distribution of the LSBs at low brightness (c) shows that the LSBs at the low brightness are signal-dependent and have low randomness. As such, the use of the LSBs as random seed numbers may not be desirable at low brightness.

In the present disclosure, when the LSBs of the pixel digital signals have poor randomness, the LSBs may be merged into an appropriate number, and the merged value securing randomness may be used as a random seed number. In the present disclosure, the merging of the LSBs may refer to an operation of proceeding with the input of the LSBs to improve randomness. The merging of the LSBs may include a product operation, and an XOR operation.

Referring to FIG. 10, graph (a) is a diagram showing a probability value 1010 when one (1) LSB of a pixel signal of an image captured at low brightness is extracted, and a probability value 1020 when eight (8) LSBs are merged. In graph (a), the x-axis value may represent the probability value of the LSBs, and the y-axis value may represent the probability value obtained by merging. As shown in graph (a), the probability 1010 of the LSBs of the pixel signals of the image captured at low brightness deviates from 0.5.

When the 8 LSBs are merged, the probability 1020 of the merged LSBs approaches 0.5.

Continuing to refer to FIG. 10, graph (b) is a probability diagram showing a probability distribution of values resulting from merging the eight (8) LSBs. As shown in graph (b), when merged, the LSBs show a uniform distribution pattern, ensuring randomness, and thus may be used as random seed numbers of the present disclosure.

As described above, merging the LSBs at low brightness increases the randomness of the LSBs. In an exemplary embodiment, a plurality of LSBs may be merged, however it may be preferable to merge in multiples of two (2). For example, two or more of the LSBs with low randomness may be merged, and/or four or more thereof may be merged. Alternatively or additionally, eight or more thereof may be merged.

FIG. 11 is a diagram showing a method of generating one random number or a plurality of random numbers for each section divided based on brightness and gain. In the diagram of FIG. 11, the x-axis represents a brightness value of an image, and the y-axis represents a gain. Referring to FIG. 11, a section may be divided according to threshold values of the brightness of the image and the gain. For example, when eight (8) LSBs are received as input through multiple channels, the image may be divided into four sections based on a first threshold Th1, a second threshold Th2, and a third threshold Th3, and the gain. In the lowest brightness section having a brightness below the first threshold value Th1, one (1) random seed number may be generated by the operation process. That is, the eight (8) LSBs may be merged into one (1) random seed number. In the next brightness section, having a brightness greater than or equal to the first threshold value Th1 and less than the second threshold value Th2, two (2) sets of four (4) LSBs may be merged to create two (2) random seed numbers. In the next brightness section, having a brightness greater than or equal to the second threshold value Th2 and less than the third threshold value Th3, four (4) sets of two (2) LSBs may be merged to create four (4) random seed numbers. In the fourth threshold section, each of the eight (8) LSBs may be used as a random seed number in the highest brightness section having a brightness greater than or equal to the third threshold value Th3. Determining the values of the brightness and gain of the corresponding image may vary depending on the performance, characteristics, and user of the image sensing device, physical properties (e.g., AP characteristics), and/or compatibility. The brightness of the image may represent the brightness of the image represented by the plurality of pixel data signals output from the ADC circuit 150 and the gain represent a gain set in the image sensor 100 to generate the image.

As shown in FIGS. 2 and 3, the random seed number generator 230 may be configured to be controlled based on at least one of a brightness of the image and a gain. Alternatively or additionally, based on the control based on the brightness, the gain, or both the brightness and the gain, the random seed number generator 230 may generate one (1) random seed number by merging the LSBs, generate one (1) to n random seed numbers by merging the LSBs, or generate the same number of the random seed numbers as the number of the input LSBs without merging. The generating of one (1) to n random seed numbers by merging the LSBs may include merging two (2) LSBs and/or merging four (4) LSBs.

In another exemplary embodiment, as shown in FIGS. 6 and 7, the random seed number generator 630 of the random number generator 660 may be configured to be controlled by mode values of various stages created based on a factor including at least one of the brightness and the gain of the image. The random seed number generator 630 may include and/or may be similar in many respects to the random seed number generator 230 described above with reference to FIG. 2, and may include additional features not mentioned above. The random seed number generator 630, according to the mode values of various stages, may generate each of one random seed number or a plurality of random seed numbers by merging the LSBs, or generate the same number of random seed numbers as the number of the input LSBs without merging. The generating of each of one random seed number or a plurality of random seed numbers by merging the LSBs may include generating two (2) random seed numbers and/or generating four (4) random seed numbers.

Returning to FIG. 2, according to an embodiment, the random seed number generator 230 may determine a section based on a factor that affects the randomness of the LSBs, and may merge the input LSBs into an appropriate number according to the section.

The shift register 240 may generate random numbers by using the values merged by the random seed number generator 230 as random seed numbers. Alternatively or additionally, the random number generator 260 may further include the random number sampler 250. The random number sampler 250 may generate a second random number having a preset bit size based on the random number received from the shift register 240 (e.g., a first random number). In an embodiment, the signal processor 280 may perform image processing by using the second random number. In another embodiment, the signal processor 280 may perform image processing by using the first random number.

In an embodiment, the shift register 240 may include the LFSR. The LFSR may have a structure in which the shift register 240 has a feedback loop and an output of a certain section of shift register chains may be connected to an XOR operator. Consequently, the shift register 240 may generate a random number column. The LFSR may have a linear feedback structure, and thus, may generate a pseudo-random number column. In some embodiments, the degree of randomness of the random number column generated by the shift register 240 may be increased by increasing a length of the shift register chains in the shift register 240, as such an increase may increase the periodicity of the random number column, and in turn, may increase the randomness of random number column. The shift register 240 may be and/or may include at least one of the shift registers described with reference to FIGS. 4 and 5. For example, the shift register 240 may be and/or may include an XOR shift register as described with reference to FIG. 4, a Fibonacci LFSR as described with reference to FIG. 5A, and a Galois LFSR as described with reference to FIG. 5B. However, the present disclosure in not limited in this regard. Notably, the aspects presented herein may be implemented with any shift register with relatively low complexity and a relatively small logic size.

As shown in FIG. 2, the random number generated by the shift register 240 may be sampled by the random number sampler 250 into a random number of a preset bit size. In an embodiment, the sampled random number may be output as a decimal number represented by k bits, where k is a positive integer greater than zero (0) (e.g., k=8). The random number may then be used for image processing by the signal processor 280.

Returning to FIG. 21, image (c) depicts an image in which the random seed generator (e.g., random seed generator 260 of FIG. 2, random seed generator 660 of FIG. 6) generates random seed numbers using digital signals received through multi-channels as input, a first random number is generated using the XOR shift register 440 of FIG. 4, and a second random number obtained by sampling the first random number is transferred to the screen. Unlike images (a) and (b), which show the occurrence of artifacts, image (c) does not show an occurrence of artifacts or an association between random numbers.

FIG. 12 illustrates a method of operating an image device, according to an embodiment. Referring to FIG. 12, the method of operating an image device (or a sensing device) may include generating a plurality of analog signals by a pixel array including a plurality of photoconverters that convert optical signals into analog electrical signals (operation S100), converting the plurality of analog signals generated from the pixel array into a plurality of digital signals (operation S200), receiving N LSB values of the plurality of digital signals and generating M random seed numbers based on the N LSB values according to brightness, gain, or both brightness and gain, where N is a positive integer greater than one (1), M is a positive integer less than or equal to N (operation S300), and generating, by a LFSR, random numbers based on the M random seed numbers (operation S400).

FIG. 13 is a flowchart showing a scheme for forming random seed numbers of an image sensing device, according to an embodiment. Referring to FIG. 13 the random seed generator (e.g., random seed generator 260 of FIG. 2, random seed generator 660 of FIG. 6) may determine how many LSBs are to be merged to generate random seed numbers based on at least one of the brightness and the gain (operation S310). In particular, the operation S300 of FIG. 12 may include generating one (1) random seed number by merging N LSBs according to brightness, gain, and/or both brightness and gain (operation S320), generating one (1) to N random seed numbers by merging N LSBs (operation S330), or generating N random seed numbers without merging the N LSBs (operation S340). In another embodiment, in the case of merging based on the eight (8) LSBs received through multiple channels, the operation S330 may include generating four (4) random seed numbers by merging four (4) sets of two (2) LSBs each of the eight (8) LSBs, and/or generating two (2) random seed numbers by merging two (2) sets of four (4) LSBs each of the eight (8) LSBs.

In another embodiment, as shown in FIG. 14, the operation S300 of FIG. 12 may include generating mode values of various stages based on brightness, gain, and/or both brightness and gain (operation S350), determining how many LSBs are to be merged according to the stages of the mode values (operation S360), and based on the determination of operation S360, generating one (1) random seed number by merging N LSBs (operation S370), generating one (1) to N random seed numbers by merging N LSBs (operation S380), or generating N random seed numbers without merging the N LSBs (operation S390). The operation S380 may include generating four (4) random seed numbers by merging four (4) sets of two (2) LSBs each of the eight (8) LSBs, and/or generating two (2) random seed numbers by merging two (2) sets of four (4) LSBs each of the eight (8) LSBs.

The signal processor (or image signal processor) may perform various image processing operations using the random numbers. Referring to FIG. 15, a method of operating an image device (or sensing device), according to the present disclosure, may include generating random numbers by performing the operations S100 to S400 illustrated in FIG. 12, and performing image processing using the generated random numbers (operation S500).

In another embodiment, as shown in FIG. 14, the method of operating the image device (or sensing device) according to the present disclosure may include generating mode values of various stages without direct control based on brightness and/or gain, generating random numbers with secured randomness by merging the appropriate number of LSBs according to the stages of the mode values, and performing image processing using the generated random numbers (operation S500).

FIG. 16 is a block diagram showing image processing performed by a signal processor, according to an embodiment.

Referring to FIG. 16, the signal processor 180 may perform image processing including offset compensation (operation S1050), auto-focus pixel (AFP) and/or bad pixel (BP) identification (operation S1062), dark level compensation (operation S1072), and/or digital gain compensation (operation S1078).

In an embodiment, the signal processor 180 may perform the offset compensation (operation S1050). To prevent the digital signals from being output as negative values due to an error (e.g., mismatch) caused during the process of converting the analog signals of pixels to digital signals by the ADC circuit, a certain margin value may be added to the digital signals. In some embodiments, the margin value may be referred to as a pedestal value. A process that compensates for addition and/or subtraction of a certain value including the pedestal value in the signal processor 180 at a later stage may be referred to as offset compensation (operation S1050). In an embodiment, the offset compensation (operation S1050) may be performed first during the image processing to remove the pedestal value.

In an embodiment, the signal processor 180 may perform the auto-focus pixel and/or bad pixel identification (operation S1062). The auto-focus pixel may be a pixel separately provided for focusing the image sensor, and the auto-focus pixel identification (part of operation S1060) may be and/or may include a process of designating the position of the auto-focus pixel and informing an image processing block thereof. The bad pixel identification (part of operation S1060) may be and/or may include a process of designating a bad pixel that may not represent a normal signal value. A process of giving signal values to designated auto-focus and/or bad pixels using peripheral values may be referred to as AFP/BP correction (operation S1060). The values calculated using the peripheral values may be given to the auto-focus and/or bad pixels having no signal data. As an example of operation processing, extrapolation may be performed to give the values to the auto-focus and/or bad pixels. As the extrapolation is performed, the pixel signals may be expressed in decimal units. As a result of approximation through the extrapolation, the bit value may increase. In some embodiments, the auto-focus pixel identification and the bad pixel correction (operation S1060) may be performed simultaneously (e.g., at substantially the same time), and in other embodiments, may be performed separately.

In an embodiment, the signal processor 180 may perform dark level compensation (operation S1072). In the dark level compensation (operation S1070), a process for removing a deviation due to dark noise along with the signal value may be performed. When the signal is compensated in this manner, the signal value may be expressed in decimal units, thereby increasing the bit level of the signal value.

The signal processor 180, according to an embodiment, may perform digital gain compensation (operation S1078). For example, if it is necessary to adjust the intensity of the pixel signal, the pixel signal value may be compensated by multiplying the pixel signal by the digital gain in a digital gain compensation block. Such digital gain compensation may include crosstalk correction (operation S1082) for correcting errors caused due to crosstalk between adjacent pixels and/or lens shading compensation (operation S1084) for compensating for the decrease in brightness of light as the distance from the center increases when light is incident on the image sensor through the lens. As such, when compensating with a digital gain, a decimal unit is expressed, and as a result, a bit value may be increased.

In addition, the signal processor 180 may perform dithering (operations S1092, S1094, and S1096). As shown in FIG. 16, in the processing performed by the signal processor 180, the dithering (operations S1092, S1094, and S1096) may be performed to process the generated decimal unit after the auto-focus pixel/bad pixel correction (operation S1062), the dark level compensation (operation S1072), and the digital gain compensation (operation S1078). In an embodiment of the operation process of dithering, stochastic rounding may be performed to minimize analog data loss by making quantization errors a uniform random distribution.

In the above-described dithering (operations S1092, S1094, and S1096) performed by the signal processor 180, decimal numbers generated by the random number generator 170 may be used. By performing dithering using these decimal numbers, digital data may be generated that may be close to the information of the original image. That is, the dithering process may correct the digital data to approach the information (e.g., values) in the original image.

FIG. 17 is a block diagram showing hardware on which image processing may be performed by a signal processor, according to an embodiment. The pixel digital signals input through the pixel array and the ADC circuit may be stored in the buffer register 1120, and the random number generator 1130 may receive the LSBs as input to generate random numbers. The random number generator 1130 may include a random seed number generator, a shift feedback register, and may further include a random number sampler, as described with reference to FIGS. 2 and 6. The generated random numbers may be stored in the buffer register 1120, and may be used for the operation process, such as dithering, when a signal processor 1140 performs various image processing operations, as described with reference to FIG. 16.

In an embodiment, the signal processor 1140 may include an offset compensation circuit 1150, an auto-focus pixel/bad pixel correction circuit 1160, a dark level compensation circuit 1170, and a digital gain compensation circuit 1180. In an embodiment, the signal processor 1140 may include a dithering circuit 1190 to perform the dithering. For example, the dithering circuit 1190 may remove decimal places from data generated through image processing, such as auto-focus pixel/bad pixel compensation, dark level compensation, and digital gain compensation.

In the present disclosure, the dithering circuit 1190 may be separately arranged in the image processing block on which the dithering is performed. In another embodiment, resources may be managed by setting up a separate dithering block and wiring the image processing block that require dithering to share the dithering circuit 1190.

When such dithering is performed, data closer to the original image may be generated by performing stochastic rounding rather than simple rounding. Therefore, in the present disclosure, stochastic rounding may be preferred over simple rounding.

A method of stochastic rounding is described with reference to FIGS. 18 and 19.

FIG. 18 is a diagram showing average values before and after simple rounding is performed on exemplary pixel signal values. FIG. 19 is a diagram showing the average values before and after stochastic rounding is performed on exemplary pixel signal values using random numbers with a uniform distribution.

Referring to FIG. 18, for example, when the input pixel values are simplified to 1.8 and simple rounding is performed, the input pixel values may increase to two (2). As shown in FIG. 18, the average value of the original pixel array may be 1.8. However, the average value of the simple rounded pixel array may be two (2). Therefore, the difference between the average of the original pixel array and the average of the simple rounded pixel array may be 0.2.

Alternatively, FIG. 19 shows a case of performing the quantization process through stochastic rounding. FIG. 19 illustrates an example of a uniform probability distribution for convenience of understanding, where rounding has been performed using a monotonically increasing probability distribution.

For example, assuming that the original pixel value X consists of an integer N and a decimal number a, the probabilistic rounding using a uniform probability distribution p may be performed according to an equation similar to Equation 1. Referring to Eq. 1, when the decimal value is less than or equal to the probability value p identified by the random distribution, a pixel value Y as a result of the stochastic rounding is N+1, and when the decimal value is greater than the probability value p, the pixel value Y is N.

$$Y = \begin{cases} N+1 & \text{if } p \geq a \\ N & \text{if } p < a \end{cases} \qquad \text{Eq. 1}$$

Referring to FIG. 19, to perform probabilistic rounding, a probability value array in which random probability values between zero (0) and one (1) (e.g., $p \in [0,1]$) are uniformly distributed may be generated, and stochastic rounding may be performed on the pixel values of the pixel array with probability values in one-to-one correspondence with the pixel values of the pixel array. As shown in FIG. 19, the average value of the resulting pixel array may be 1.7969. That is, the difference between the average value of the original pixel array and the average value of the result array may be small, particularly when compared to simple rounding. In addition, stochastic rounding randomizes the quantization error across the entire pixel array. Consequently, a uniform distribution may be seen throughout the pixel array.

FIG. 20 is a diagram showing a process of performing stochastic rounding using random numbers generated by a random number generator according to an embodiment. For a pixel array consisting of m rows and n columns, as shown in Equation 2, when the pixel value $P_{mn}$ is divided into a natural number $N_{mn}$ and a decimal number $a_{mn}$, a probability value array $R_{mn}$ with uniform and randomly distributed probability values may be in one-to-one correspondence with the original pixel array. In the present disclosure, the decimal value may be compared with the corresponding probability value. When the decimal value is less than or equal to the probability value, a pixel result value $Y_{mn}$ is N+1, and when the decimal value is greater than the probability value, the pixel result value $Y_{mn}$ is N. The probability value of each array element of the probability value array may be generated by mapping the random numbers generated by at least one of the random number generators 260 and 660 described with reference to FIGS. 2 and 6.

$$P_{mn} = N_{mn} + a_{mn} \qquad \text{Eq. 2}$$

$$Y_{mn} = \begin{cases} N_{mn} + 1 & \text{if } R_{mn} \geq a_{mn} \\ N_{mn} & \text{if } R_{mn} < a_{mn} \end{cases}$$

FIG. 22 shows various types of cluster cells, according to an embodiment. Referring to FIG. 22, image (a) shows a tetracell, image (b) shows a nonacell, and image (c) shows a hexacell. As used herein, a cluster cell may refer to a pixel group in which a plurality of pixels of the same color are combined. The pixels constituting a cluster cell may be referred to as subpixels. In an embodiment, as shown in image (a), four (4) sub-pixels may be combined to form a group. As shown in image (b), nine (9) sub-pixels may be combined to form a group. As shown in image (c), 16 sub-cells may be combined to form a group. With respect to such cluster cells, subpixels may operate individually, and/or a group of subpixels may operate as one giant pixel, depending on the mode.

In an embodiment, the cluster cells may operate in different modes depending on brightness. For example, in an image sensing device having a cluster pixel, the sub-pixels may operate individually as one pixel at high brightness, and may operate as one giant pixel at low brightness.

FIG. 23 and FIG. 24 are circuit diagrams for implementing a tetrapixel, according to an embodiment. Referring to FIG. 23, a pixel may include a plurality of photodiodes (e.g., first photodiode PD1, second photodiode PD2, third photodiode PD3, and fourth photodiode PD4), a plurality of transistors (e.g., first transfer gate transistor TG1, second transfer gate transistor TG2, third transfer gate transistor TG3, fourth transfer gate transistor TG4, reset transistor RST, source follower transistor SF, and select transistor SEL), and a floating diffusion region (FD). The first to fourth photodiodes PD1 to PD4 may share the floating diffusion region (FD). When the brightness is high, the first to fourth photodiodes PD1 to PD4 may be connected to the first to fourth transfer gate transistors TG1 to TG4, respectively, and may individually send charge to the floating diffusion region FD by opening and closing the first to fourth transfer gate transistors TG1 to TG4. When the brightness is low, the first to fourth transfer gate transistors TG1 to TG4 may be opened and closed simultaneously and/or sequentially to transfer the charge generated by the plurality of photodiodes PD1 PD4 to the floating diffusion region FD. A voltage proportional to the charge accumulated in the floating diffusion region FD may applied to a gate terminal of the source follower transistor SF, and the source follower transistor SF may generate pixel signals (e.g., pixel voltage) based on the voltage of the gate terminal. When the select transistor SEL is turned on, the pixel signals may be output to the column line CL, and may be transmitted to the ADC circuit through the column line CL. The reset transistor RST may be turned on and may place a power supply voltage Vdd into a reset state by removing the charge in the floating diffusion region FD.

Referring to FIG. 24, in another embodiment, the pixel may include a plurality of transistors TG (e.g., first transistor TG1, second transistor TG2, third transistor TG3, fourth transistor TG4), a first floating diffusion region FD1, and photodiodes PD (e.g., first photodiode PD1, second photodiode PD2, third photodiode PD3, and fourth photodiode PD4). Compared with FIG. 23, the pixel may further include a second floating diffusion region FD2 and a double control gate transistor DCG. In some embodiments, a relatively large charge may be generated in the photodiodes at high brightness, and/or at a long-term exposure in low brightness. In such embodiments, the double control gate transistor DCG may be turned on to use the first floating diffusion region FD1 and the second diffusion region FD2 together. Consequently, the capacitance of the floating diffusion may be increased.

According to an embodiment, in an image sensing device including a cluster cell, at high brightness, LSBs generated based on pixel signals generated from sub-pixels forming the cluster cell may be used as random seed numbers. With respect to the operation according to the present disclosure, at high brightness, the ADC circuit may convert the analog signals received from the subpixels into digital signals, and the random number generator may use the LSBs generated based on the pixel signals received from each subpixel as random seed numbers. Alternatively or additionally, in an embodiment, at low brightness, the LSBs generated from the analog signals collected in the cluster cell (e.g., collected in sub-pixels) may be used as the random seed numbers.

In another embodiment, at low brightness, a charge generated in each subpixel may be collected in the floating diffusion region FD, and the ADC circuit may convert the analog signals generated according to the amount of charge in the floating diffusion region FD into digital signals. Using the LSBs of the converted digital signals as input, random seed numbers may be generated by merging an appropriate number of the LSBs according to sections determined based on brightness and/or gain, and random numbers may be generated using the random seed numbers as input.

FIG. 25 is a block diagram showing data transmission between an image sensing device and a host. The image sensing device 1900 may perform image processing, such as, but not limited to, bad pixel correction and auto-focus pixel correction on the pixel digital signals to potentially improve image quality and remove noise. After performing image processing, the image sensing device 1900 may convert the pixel digital signals (e.g., image data) into a Bayer pattern, and may transmit the image data to the host 1950. The image data that has been subjected to image processing in the image sensing device 1900 may be stored in the registers 1920. The image sensing device 1900 may transmit data to the host 1950 through a data lines 1930, and/or may transmit and/or receive control signals through address lines 1940.

The image sensing device 1900 may be and/or may include a CIS sensing device. The host 1950 may be and/or may include, but not be limited to, an application processor (AP) of a mobile phone, a central processing unit (CPU) and/or a microcontroller unit (MCU) of an electronic (electrical) device including an automobile, for example. The host 1950 may include an image processing core for image processing, and may further perform image processing, such as, but not limited to, color correction, image filtering, demosaicing and the like.

An electronic device system including the imaging sensing device 1900 and the host 1950 may include a plurality of imaging sensing devices, and may perform object recognition, operation analysis, ranging, autonomous driving, and the like.

As described above, the present disclosure provides a solution for ensuring randomness of random numbers implemented by a logic circuit in a multichannel image sensing device. The present disclosure may ensure and/or increase the randomness of random seed numbers. In another aspect, the present disclosure provides a circuit system for implementing random numbers in the multichannel image sensing device. Through the present disclosure, the image processing of the image sensing device may be improved.

While the present disclosure has been particularly shown and described with reference to embodiments thereof, it may be understood that various changes in form and details may be made therein without departing from the spirit and scope of the following claims.

What is claimed is:

1. An image sensing device, comprising:
   a pixel array comprising a photoconverter configured to convert optical signals into analog electrical signals;
   an analog-digital converting (ADC) circuit configured to convert the analog electrical signals received from the pixel array into digital signals;
   an address bus;
   a random number generator configured to generate random numbers based on an input of least significant bits (LSBs) of a plurality of digital signals transmitted from the ADC circuit through the address bus; and
   a signal processor configured to perform image processing using the random numbers,
   wherein the random number generator comprises:
      a random seed number generator configured to generate M random seed numbers based on the N LSBs, wherein N is a positive integer greater than one, and wherein M is a positive integer less than or equal to N; and
      a shift register configured to generate the random numbers based on the M random seed numbers.

2. The image sensing device of claim 1, wherein the LSBs of the plurality of digital signals are transmitted from the address bus to the signal processor through a plurality of channels.

3. The image sensing device of claim 1, wherein N is greater than or equal to four and less than or equal to 16.

4. The image sensing device of claim 1, wherein the random seed number generator is further configured to:
   generate the M random seed numbers based on the N LSBs of the plurality of digital signals and a mode value selected from among a plurality of mode values, the mode value being selected based on at least one of a brightness of an image and a gain of the image, and
   wherein the random seed number generator is configured to generate the M random seed numbers by:
   generating, based on the mode value being a first mode value, a random seed number by merging the N LSBs of the plurality of digital signals;
   generating, based on the mode value being a second mode value, the M random seed numbers by merging the N LSBs of the plurality of digital signals; and
   generating, based on the mode value being a third mode value, N random seed numbers without merging the N LSBs of the plurality of digital signals.

5. The image sensing device of claim 4, wherein the random seed number generator is further configured to:
   select the third mode value as the mode value, based on the brightness of the image being a maximum brightness and the gain of the image being a maximum gain.

6. The image sensing device of claim 4, wherein the random seed number generator is further configured to:

select the first mode value as the mode value, based on the brightness of the image being a minimum brightness and the gain of the image being a minimum gain.

7. The image sensing device of claim 4, wherein the random seed number generator is further configured to:
   generate two random seed numbers by merging the N LSBs based on the mode value selected based on at least one of the brightness of the image and the gain of the image.

8. The image sensing device of claim 1, wherein the shift register comprises at least one of a Galois feedback register, a Fibonacci feedback register, and an XOR register.

9. An operating method of an image device, comprising:
   generating a plurality of analog electrical signals by a pixel array comprising a plurality of photoconverters that convert optical signals into the plurality of analog electrical signals;
   converting the plurality of analog electrical signals generated by the pixel array into a plurality of digital signals;
   receiving N least significant bit (LSB) values of the plurality of digital signals, N being a positive integer greater than one;
   generating M random seed numbers based on the N LSB values based on at least one of a brightness of an image and a gain of the image, wherein M is a positive integer less than or equal to N; and
   generating, by a linear feedback shift register, random numbers based on the M random seed numbers.

10. The method of claim 9, wherein the N LSB values comprise random noise signals of pixels.

11. The method of claim 9, wherein the generating of the M random seed numbers comprises at least one of:
   generating a random seed number by merging the N LSBs, based on the brightness being a minimum brightness and the gain being a minimum gain;
   generating 2 to N−1 random seed numbers by merging N LSBs; and
   generating N random seed numbers without merging the N LSBs, based on the brightness being a maximum brightness and the gain being a maximum gain.

12. The method of claim 11, further comprising:
   performing stochastic rounding using the random numbers.

13. The method of claim 12, wherein the performing of the stochastic rounding is performed as part of decimal processing during or subsequent to bad pixel processing.

14. The method of claim 12, wherein the performing of the stochastic rounding is performed as part of decimal processing during or subsequent to dark level correction.

15. The method of claim 12, wherein the performing of the stochastic rounding is performed as part of decimal processing during or subsequent to digital gain compensation for image processing.

16. The method of claim 12, wherein the performing of the stochastic rounding is performed as part of decimal processing during or subsequent to error correction due to crosstalk between adjacent pixels.

17. An image sensing device, comprising:
   a pixel array comprising a cluster cell in which a plurality of pixels of a same color are disposed adjacently;
   an analog-to-digital converting (ADC) circuit configured to convert a plurality of analog signals generated from the plurality of pixels into a plurality of digital signals;

a random number generator configured to receive a plurality of least significant bits (LSBs) of the plurality of digital signals and generate random numbers based on the plurality of LSBs; and a signal processor configured to perform image processing using the random numbers, wherein the random number generator comprises:

a random seed number generator configured to generate M random seed numbers based on the N LSBs, wherein N is a positive integer greater than one, and wherein M is a positive integer less than or equal to N; and a shift register configured to generate the random numbers based on the M random seed numbers.

18. The image sensing device of claim 17, wherein the cluster cell comprises one selected from among 4, 9, and 16 sub-pixels, and wherein the random number generator is further configured to:

generate, when a brightness of an image is greater than a preset brightness value, random seed numbers based on the plurality of LSBs generated in each pixel of the plurality of pixels;

generate, when the brightness of the image is less than the preset brightness value, random seed numbers based on the plurality of LSBs generated from the plurality of analog signals from the cluster cell; and generate a random seed number selected from among 1, 2, 4, 8, and 16 based on mode values created based on the brightness of the image and a gain of the image.

19. The image sensing device of claim 17, wherein the random number generator is further configured to:

determine one or more sections based on a gain of an image;

generate a plurality of random seed numbers based on sections of the one or more sections with a gain exceeding a predetermined gain threshold, and generate a random seed number by merging sections of the one or more sections with gains less than the predetermined gain threshold.

* * * * *